(12) United States Patent
Ishikawa et al.

(10) Patent No.: US 10,535,257 B2
(45) Date of Patent: Jan. 14, 2020

(54) TRANSFER OF IMAGE DATA TAKEN BY AN ON-VEHICLE CAMERA

(71) Applicant: International Business Machines Corporation, Armonk, NY (US)

(72) Inventors: Nobuyuki Ishikawa, Yokohama (JP); Kazuhiro Konno, Ichikawa (JP); Masakuni Okada, Chiba (JP); Akira Saitoh, Ichikawa (JP); Hiroki Yoshinaga, Urayasu (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/789,757

(22) Filed: Oct. 20, 2017

(65) Prior Publication Data

US 2019/0122540 A1  Apr. 25, 2019

(51) Int. Cl.
*G08G 1/01* (2006.01)
*G08G 1/0967* (2006.01)
(Continued)

(52) U.S. Cl.
CPC ..... *G08G 1/0112* (2013.01); *G08G 1/096791* (2013.01); *H04N 5/247* (2013.01); *H04N 7/0806* (2013.01)

(58) Field of Classification Search
CPC ........... G08G 1/0112; G08G 1/096791; H04N 5/247; H04N 7/0806
See application file for complete search history.

(56) References Cited

U.S. PATENT DOCUMENTS

2004/0138809 A1* 7/2004 Mukaiyama ..... G08G 1/096716
  701/400
2009/0231158 A1* 9/2009 Grigsby ............... G08G 1/0962
  340/902

(Continued)

FOREIGN PATENT DOCUMENTS

CN 104900089 A 9/2015
CN 105291984 A 2/2016
(Continued)

OTHER PUBLICATIONS

Sago et al., "A Study on Data Dissemination for Information Sharing Based on Inter-Vehicle Communication," DBSJ Letters, vol. 5, No. 2, Sep. 2006, pp. 1-4, see Abstract.
(Continued)

*Primary Examiner* — Gelek W Topgyal
(74) *Attorney, Agent, or Firm* — Winstead, P.C.

(57) ABSTRACT

A method, system, and computer program product for transferring image data taken by an on-vehicle camera. The image data and nearby-vehicle information on a vehicle are received, where the image data and the nearby-vehicle information are successively transferred from each of a plurality of vehicles capable of making a communication with each other. Furthermore, information on a line of vehicles is generated based on the nearby-vehicle information. The image data is then associated with the information on the line of vehicles. Display data may then be generated using the image data. Furthermore, the display data may be presented on a display device in the vehicle.

14 Claims, 25 Drawing Sheets

(51) Int. Cl.
*H04N 5/247* (2006.01)
*H04N 7/08* (2006.01)

(56) References Cited

U.S. PATENT DOCUMENTS

| | | | |
|---|---|---|---|
| 2009/0234859 A1* | 9/2009 | Grigsby | G08G 1/161 |
| 2011/0121991 A1* | 5/2011 | Basir | G08G 1/0962 |
| | | | 340/902 |
| 2012/0188105 A1* | 7/2012 | Alkhalaf | B60R 16/0232 |
| | | | 340/989 |
| 2015/0097962 A1 | 4/2015 | Rauscher et al. | |
| 2016/0247538 A1* | 8/2016 | Chuang | G11B 27/10 |
| 2017/0015263 A1* | 1/2017 | Makled | B60R 21/00 |
| 2017/0025017 A1* | 1/2017 | Thomas | G06K 9/00798 |
| 2017/0039848 A1* | 2/2017 | Hakeem | G08G 1/052 |
| 2017/0169711 A1 | 6/2017 | Baek et al. | |

FOREIGN PATENT DOCUMENTS

| | | |
|---|---|---|
| CN | 106059666 A | 10/2016 |
| KR | 20140074616 A | 6/2014 |

OTHER PUBLICATIONS

Ukai et al., "The Determination of Network Address Using Image Processing in Vehicle to Vehicle Communication," IPSJ SIG Technical Report, 2009, pp. 1-8, see Abstract.

Gomes et al., "The See-Through System: From Implementation to Test-Drive," Vehicular Networking Conference (VNC), Nov. 14-16, 2012, pp. 1-8.

Ben Coxworth, "See-Through System Turns View-Blocking Vehicles Transparent," https://newatlas.com/see-through-system/29446, Oct. 17, 2013, pp. 1-6.

International Search Report and Written Opinion of the International Searching Authority for International Application No. PCT/IB2018/057915 dated Jan. 30, 2019, pp. 1-9.

* cited by examiner

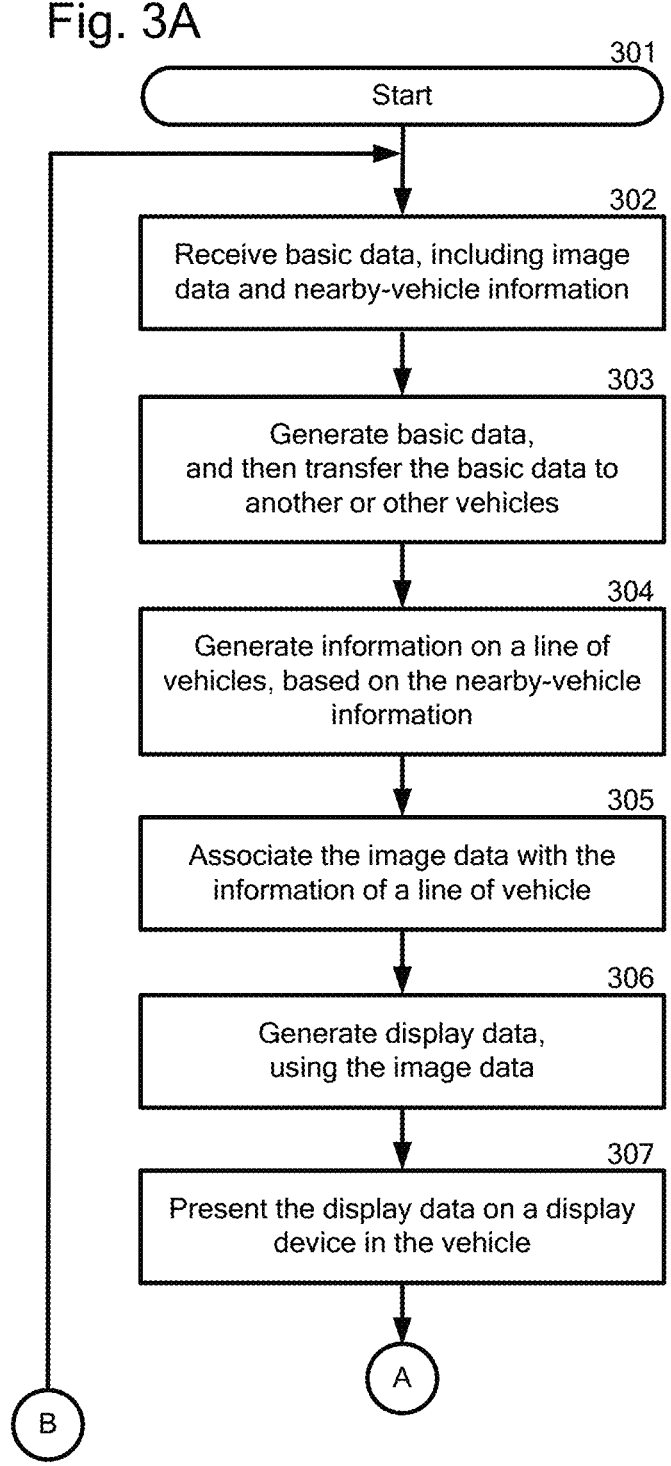

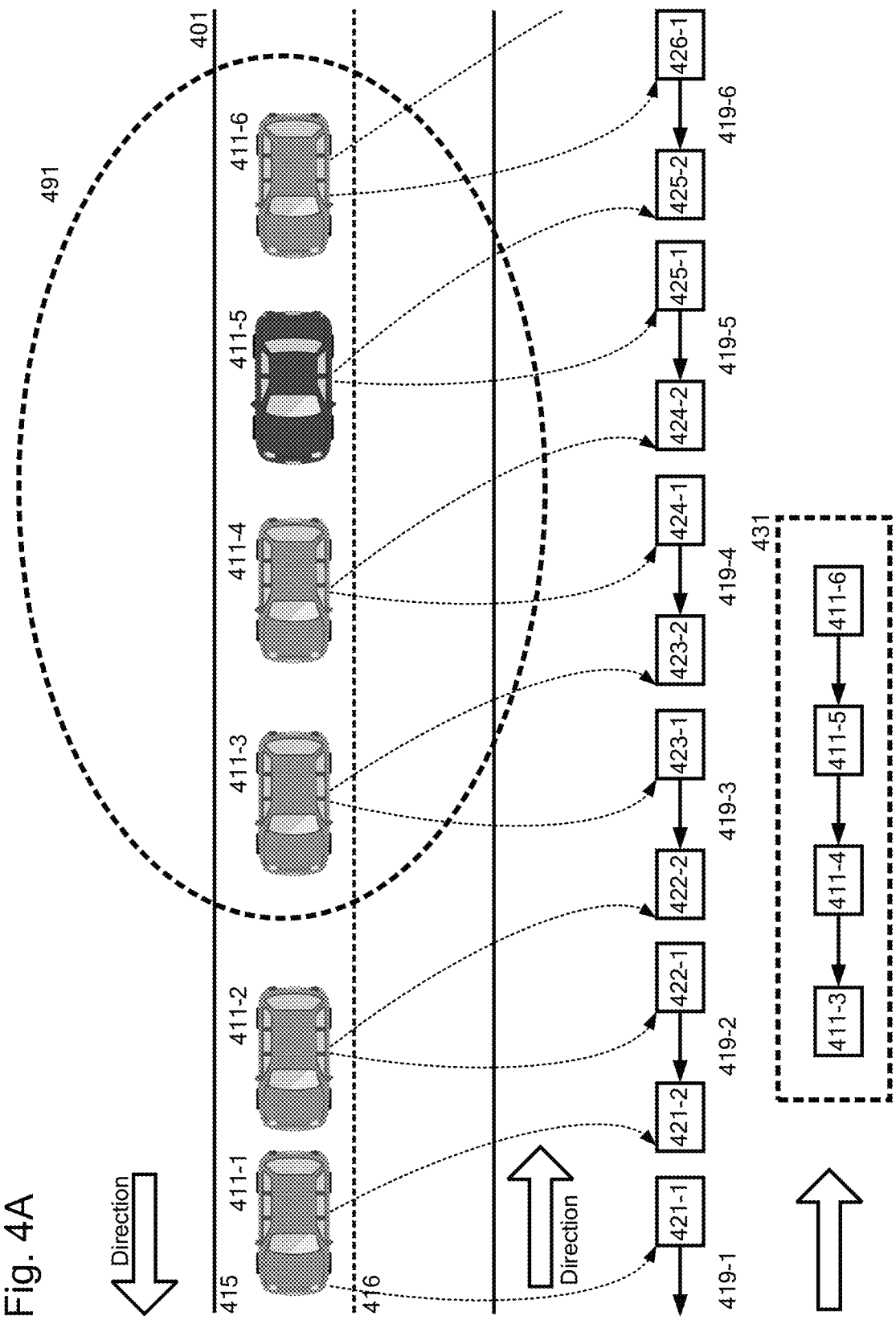

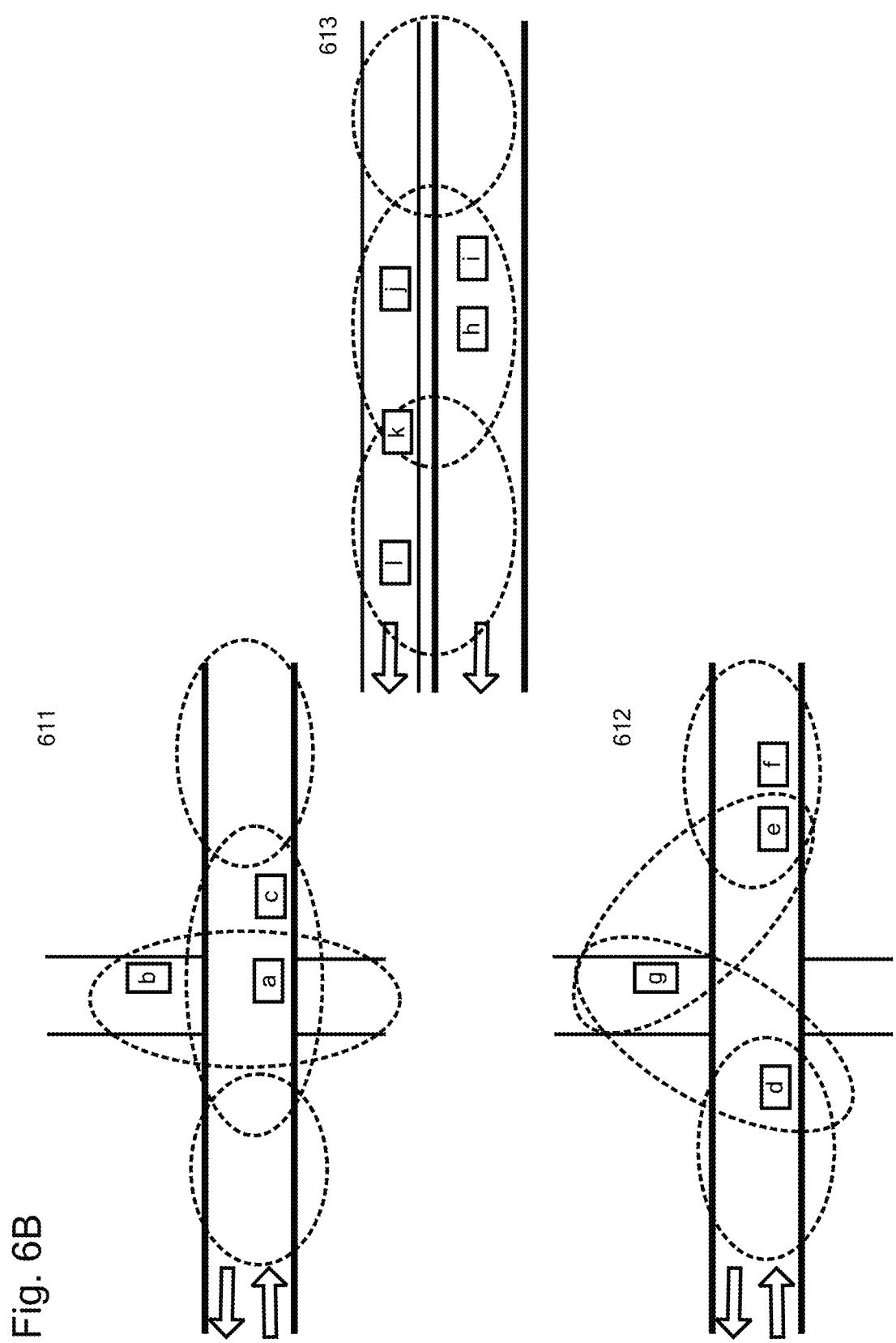

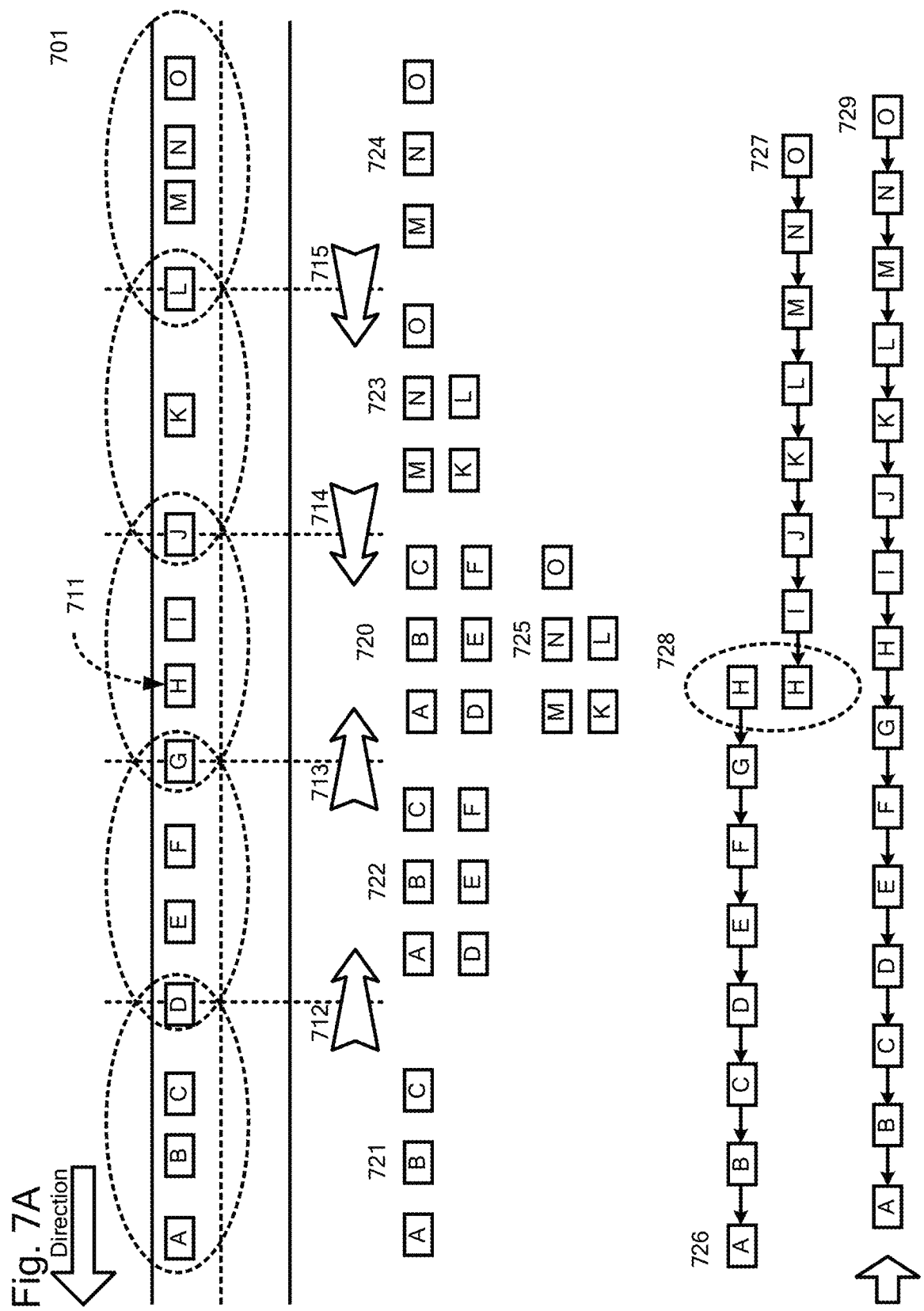

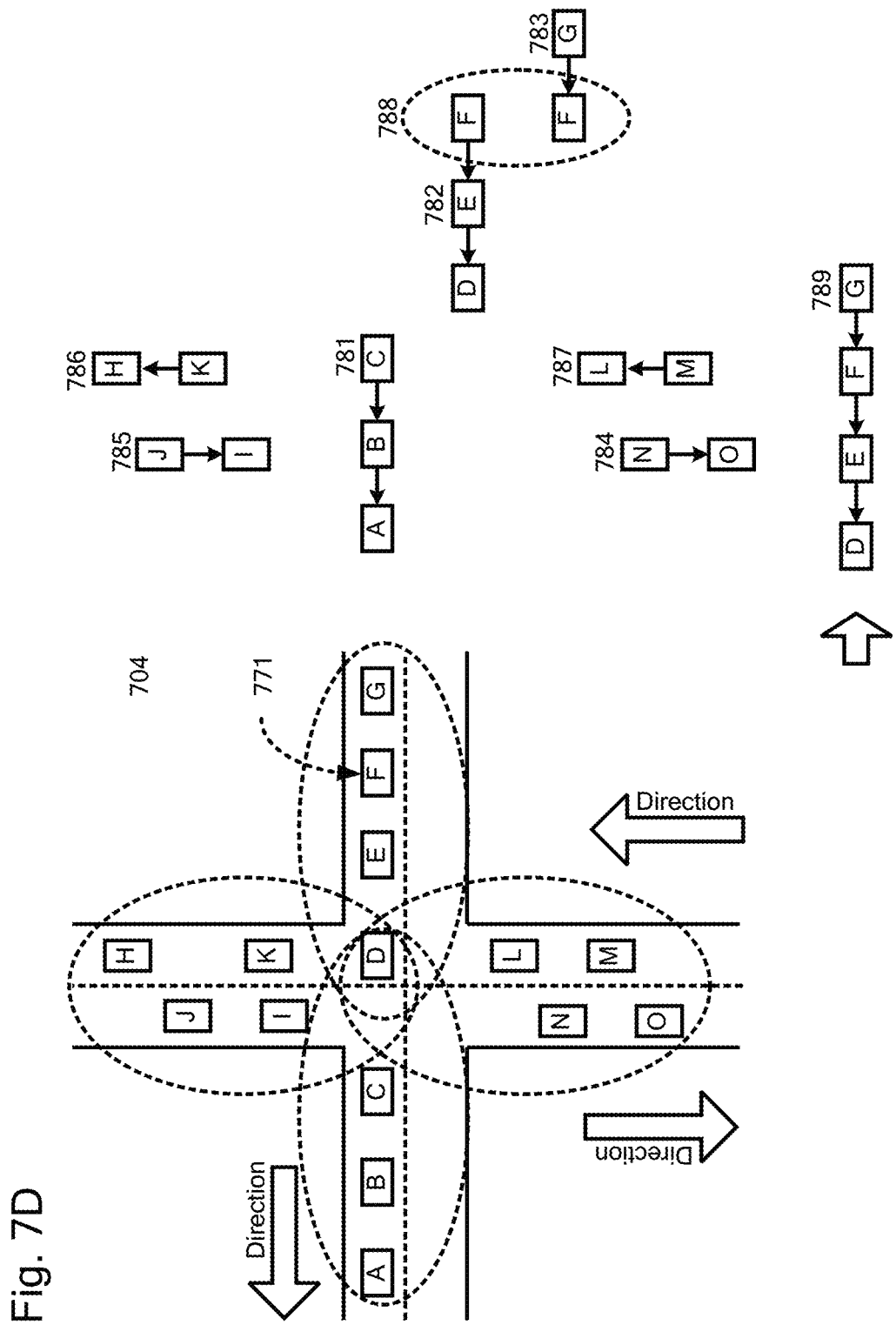

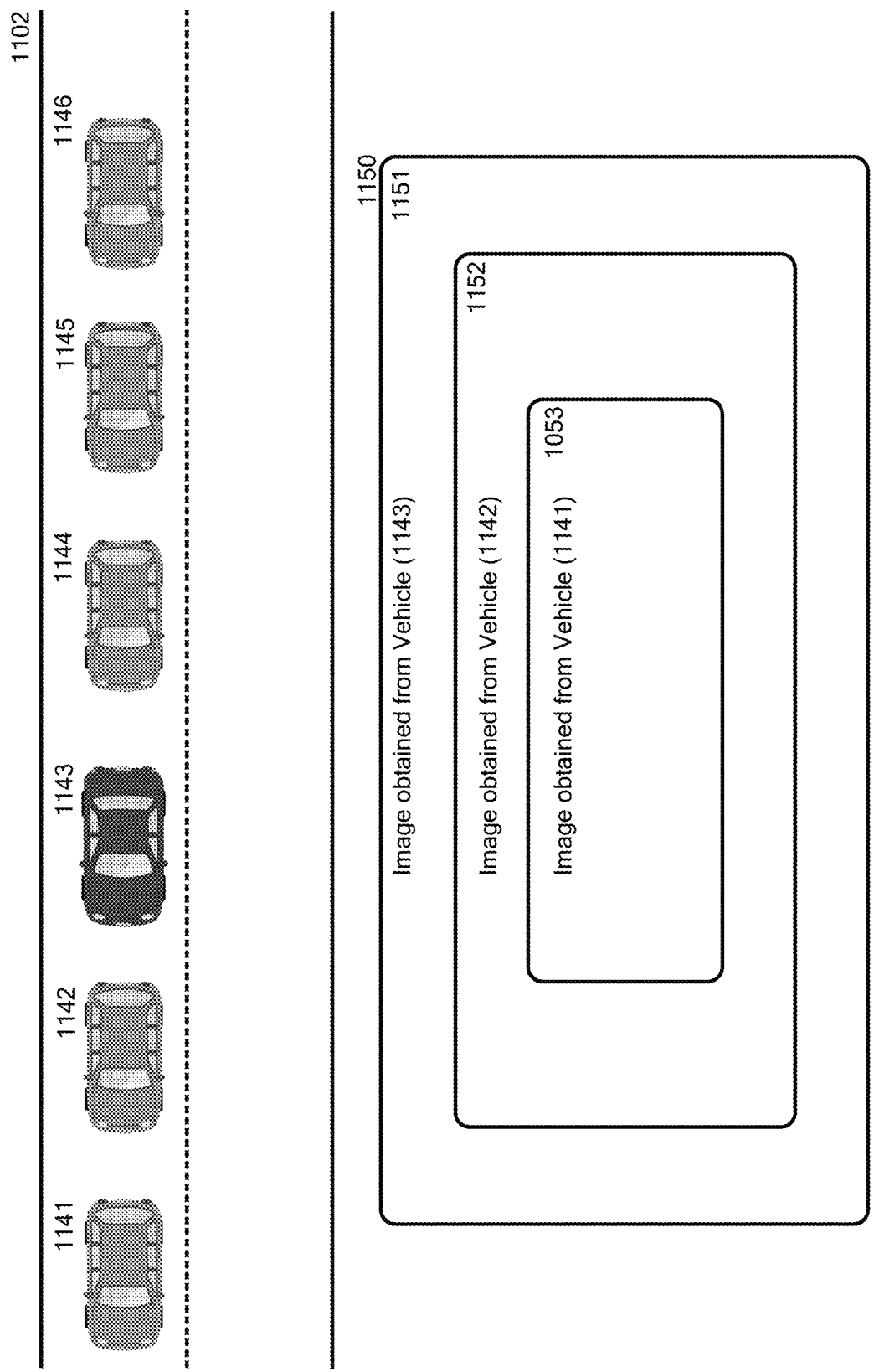

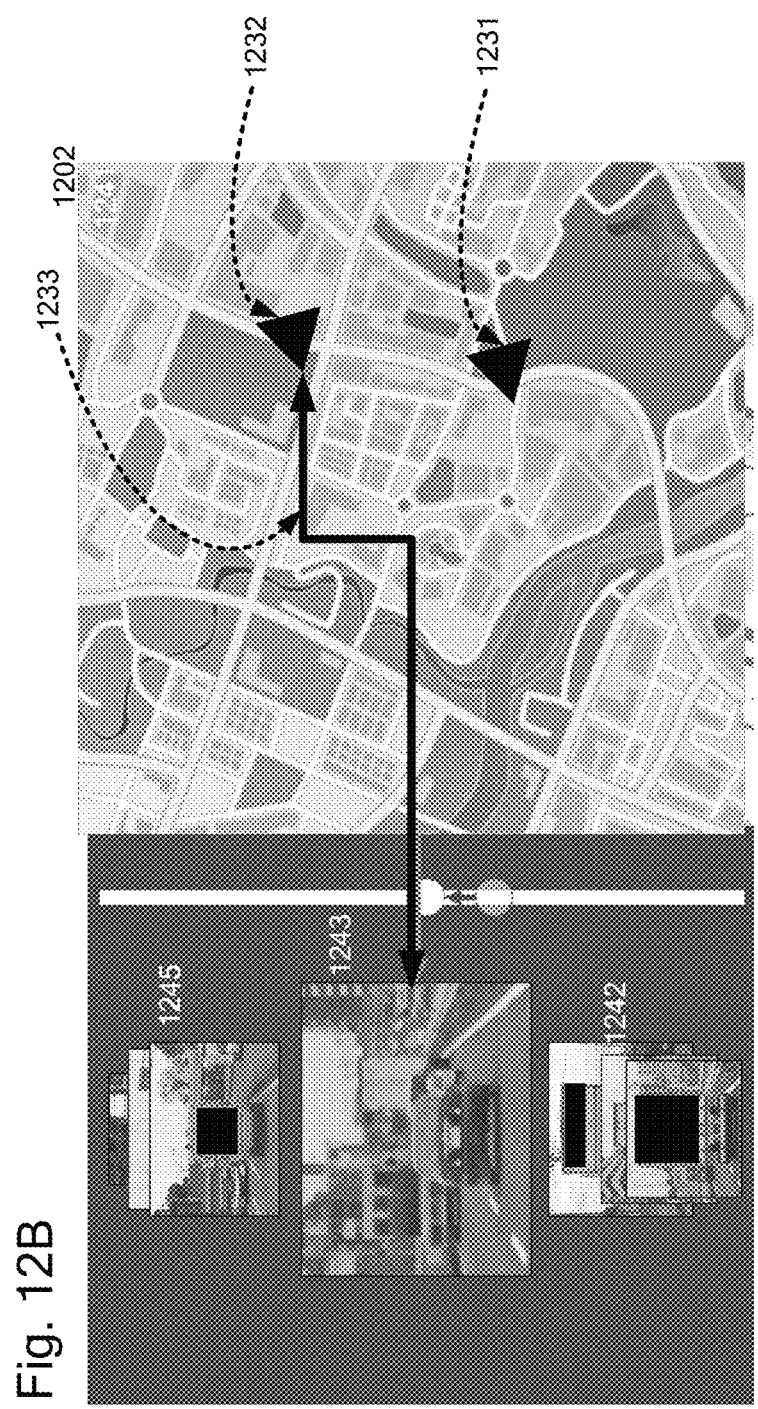

TRANSFER OF IMAGE DATA TAKEN BY AN ON-VEHICLE CAMERA

TECHNICAL FIELD

The present invention relates generally to the field of vehicles, and more particularly to transferring image data taken by an on-vehicle camera.

BACKGROUND

Vehicle-to-vehicle (V2V) networks have been developed to allow vehicles to talk to each other. V2V communication, also called inter-vehicle communication, forms wireless ad hoc networks between vehicles, using wireless access technologies such as IEEE 802.11p. Such wireless ad hoc networks are also referred to as vehicular ad hoc networks, VANETs. VANETs are specially design as low cost network which provides communication during mobility.

Recently, information sharing based on the V2V networks is effective for improving data availability. A variety of information can be transferred, for example, for supporting assistance drivers in order to help them to avoid collisions. Such information can comprise information on position, speed of vehicles, and environment.

Further, as technology has been also developed, on-vehicle cameras including real-time video cameras have been mounted in vehicles for recording events. These on-vehicle cameras record various events. The image data taken by an on-vehicle camera can be also transferred using V2V networks.

Still further, the See-Through System (STS) has been also developed. The STS leverages on V2V communication and windshield-installed cameras to transform vision-obstructing vehicles into transparent tubular objects.

SUMMARY

In one embodiment of the present invention, a computer-implemented method for transferring image data taken by an on-vehicle camera comprises receiving the image data and nearby-vehicle information on a vehicle, the image data and the nearby-vehicle information being successively transferred from each of a plurality of vehicles capable of making a communication with each other. The method further comprises generating, by a processor, information on a line of vehicles based on the nearby-vehicle information. The method additionally comprises associating, by the processor, the image data with the information on the line of vehicles in response to generating the information on the line of vehicles.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIGS. 3A and 3B illustrate an embodiment of exemplified flowchart of a process for transferring image data taken by an on-vehicle camera of a vehicle;

FIGS. 4A and 4B illustrate an embodiment of exemplified diagrams of generating basic data, transferring basic data, and generate information on a line of vehicles;

FIGS. 6A and 6B illustrate an embodiment of exemplified diagrams of transferring basic data and transferring the basic data between or among groups;

FIGS. 7A to 7D illustrate an embodiment of exemplified diagrams of generating information on a line of vehicles, based on the nearby-vehicle information;

FIGS. 11A and 11B illustrate an embodiment of exemplified diagrams of presenting in real-time display data comprising image data which is being successively sent from the specified vehicle or from each of vehicles which is traveling in the vicinity of the specified location or specified subject;

FIGS. 12A and 12B illustrate an embodiment of exemplified diagrams of displaying image data together with an electronic map.

DETAILED DESCRIPTION

Figure 1A:
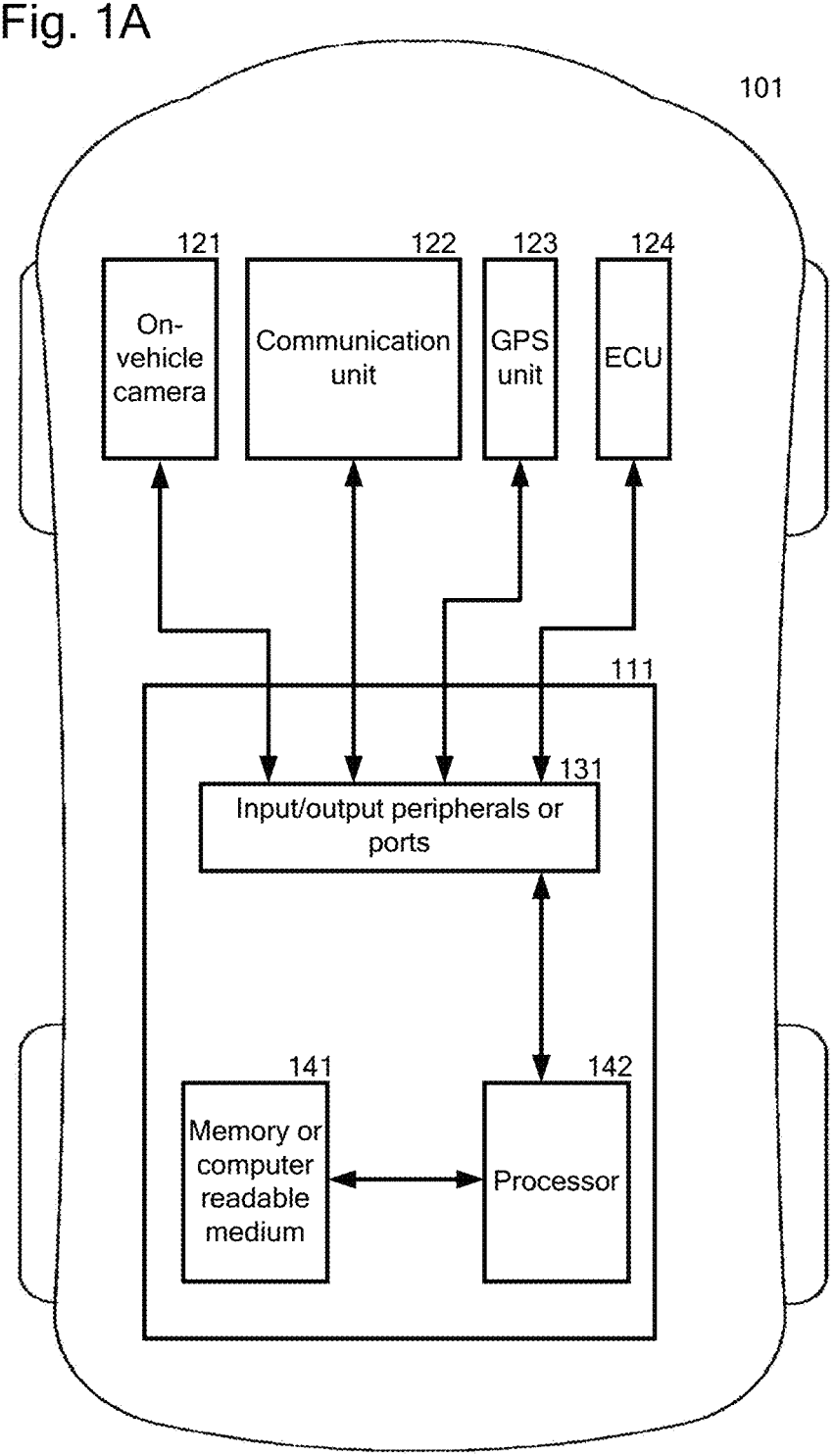
FIG. 1A illustrates an exemplified basic block diagram of a vehicle which may be used in an embodiment of the present invention.

When a traffic jam occurs, or some accident or other incident happens, it may be difficult to know surrounding environments except through a radio or television broadcasting.

Further, when a larger vehicle, such as a truck or bus, is driving ahead of or behind a vehicle, it may be difficult to know environments in front of or behind the vehicle itself.

Accordingly, there may be a need to obtain image data or views taken by another or other vehicles in order to know surrounding environments of another or other vehicles, such as environments in front of or behind another or other vehicles.

Further, there is a need to see, in real time while driving, image taken by a specified vehicle or image for a specified environment, such as specified location or specified subject.

According to one aspect of the present invention, an embodiment of the present invention provides a computer-implemented method for transferring image data taken by an on-vehicle camera.

In one embodiment, the method comprises the following: receiving the image data and information on a vehicle which locates in the vicinity of a vehicle (hereinafter also referred to as "nearby-vehicle information"), the image data and nearby-vehicle information being successively transferred from each of a plurality of vehicles capable of making a communication with each other, and generating information on a line of vehicles, based on the nearby-vehicle information, and then associating the image data with the information on a line of vehicles.

In another embodiment, the method may further comprise that the line of vehicles is composed of a plurality of groups, and each of the groups has at least one vehicle commonly belonging to two or more groups among the plurality of groups, and the at least one vehicle transfers the image data and the nearby-vehicle information to the two or more groups.

In a further embodiment, the method may further comprise that, in response to a user selection of a specific vehicle, image data taken by an on-vehicle camera of the specified vehicle is successively transferred.

In yet another embodiment, the method may further comprise that in response to a user selection of a specific location or specific subject, image data taken by an on-vehicle camera of each of vehicles which locates in the vicinity of the specified location or specified subject is successively transferred, respectively. Each vehicle may be traveling in the vicinity of the specified location or specified subject.

In still another embodiment, the method may further comprise generating display data, using the image data, and then optionally presenting the display data on a display device in the vehicle.

According to another aspect of the present invention, a system, such as a computer system, comprising a processor and a memory storing a program of instructions executable by the processor to perform one or more methods described herein may be provided.

According to a further another aspect of the present invention, a computer program product comprising a computer readable storage medium storing a program of instructions executable by a system to perform one or more methods described herein also may be provided.

According to the aforementioned embodiment of the present invention, image data taken by an on-vehicle camera of another or other vehicles is provided and further the image data is associated with information on a line of vehicles.

According to the aforementioned another embodiment of the present invention, image data can be transferred to a vehicle(s) belonging to each of one or more groups different from a group where the image was taken. Accordingly, the image data can be transferred to the vehicle(s), even if the vehicles do not belonging to the same group. In other words, the image data can be transferred between or among groups.

According to the aforementioned embodiment of the present invention, a user in a vehicle can see image successively taken by an on-vehicle camera of a vehicle specified by the user. Accordingly, the user can know surrounding environments through the image taken by an on-vehicle camera of the vehicle specified by the user.

According to the aforementioned embodiment of the present invention, a user in a vehicle can see image of a location or subject specified by the user through the transfer of image data taken by an on-vehicle camera of each of vehicles which is traveling in the vicinity of the specified location or specified subject.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, an embodiment of the present invention may be embodied as a method, system, or computer program product. Accordingly, an embodiment of the present invention may take the form of entirely hardware embodiment, an entirely software embodiment, including firmware, resident software ad micro-code, etc., or an embodiment combining software and hardware aspects that may all generally be referred to herein as a "circuit", "module", or "system".

To define more clearly the terms used herein, the exemplified definitions are provided hereinafter, but the meaning of the terms should be interpreted broadly as known to the technical field to which the present invention relates.

As used herein, the term "vehicle" refers to any suitable mobile vehicle. Such vehicles may include, for example but not limited to, any number of wheeled vehicles, such as four or more wheeled vehicles, including cars, trucks, buses, and other four wheeled vehicles; two-wheeled vehicles, including motorcycles, bicycles, and other two wheeled vehicles; as well as trains.

The vehicle may also comprise an on-vehicle camera for allowing the vehicle to take image, i.e. visual information, in a predefined area surrounding the vehicle.

The vehicle may also comprise a device for allowing the vehicle to make a communication between or among vehicles through networks, using a communication unit described below.

The vehicle may further comprise a GPS unit or any appropriate location device for obtain information on position or geolocation of the vehicle itself. The appropriate location devices may be, for example, but not limited to, an electronic compass, triangulation device, radar, sonar, or combination thereof. The GPS will be hereinafter discussed for convenience.

As used herein, the term "an on-vehicle camera" refers to any camera suitable for taking an image and then storing it as image data. For example, the on-vehicle camera may be equipped with a vehicle in order to record image of a vehicle which is driving ahead of this vehicle with which the on-vehicle camera is equipped.

Hereinafter, an embodiment of the present invention will be detailed explained with reference to the following FIGS. 1A and 1B, FIG. 2, FIGS. 3A and 3B, FIGS. 4A and 4B, FIGS. 5A and 5B, FIGS. 6A and 6B, FIGS. 7A to 7D, FIGS. 8A and 8B, FIGS. 9A and 9B, FIGS. 10A and 10B, FIGS. 11A and 11B, and FIG. 12.

The idea of an embodiment of the present invention is based on the following perceptions.

In development of technologies, vehicles tend to be equipped with on-vehicle cameras, communication unit such as V2V communication, and GPS. Accordingly, a new mechanism for obtain image data or views taken by another or other vehicles will be established using the on-vehicle cameras, communication unit such as V2V communication, and optionally GPS.

With reference now to FIG. 1A, FIG. 1A illustrates an exemplified basic block diagram of a vehicle which may be used in an embodiment of the present invention.

A vehicle (101) is illustrated as an exemplified basic block diagram. The vehicle (101) may typically comprise a controller (111) and an engine control unit or ECU (124). Further, the vehicle (101) may comprise an on-vehicle camera (121), a communication unit (122) and a global positioning system or GPS or any appropriate location unit (123). Hereinafter, the GPS or any appropriate location unit (123) is simply referred to as the GPS unit (123).

The controller (111) may be a non-generalized, electronic control device and may comprise input/output peripherals or ports (131), a memory or computer readable medium (141) and a processor (142). Hereinafter, the memory or computer readable medium (141) is simply referred to as the memory (141). The controller (111) can be in communication with the on-vehicle camera (121), the communication unit (122), the GPS unit (123) and the ECU (124).

The on-vehicle camera (121) includes one or more optical sensors or cameras. The on-vehicle camera (121) is operable to take image, i.e. visual information, in a predefined area surrounding the vehicle (101). The on-vehicle camera (121) may exist typically in front of its own vehicle. Visual data from the on-vehicle camera (121) is communicated to the controller (111). The on-vehicle camera (121) may take image continuously, for example in a predefined period, while driving, and store the taken image as the image data into a storage, for example, into the memory (141). The on-vehicle camera (121) may further take image of a vehicle which locates in the vicinity of a vehicle (or "nearby-vehicle"). The image of the nearby-vehicle information can be used to obtain nearby-vehicle information. The nearby-vehicle information may be generated by the processor (142).

The communication unit (122) includes a receiver operable to receive wireless data from another or other vehicles, for example, remote V2V equipped vehicle or vehicles. The communication unit (122) can communicate with another or other vehicles using vehicle networks, such as V2V networks, for example, ad-hoc V2V networks including mobile ad hoc networks (MANETs), vehicular ad hoc networks (VANETs), or Intelligent vehicular ad hoc networks (InVANETs). The communication unit (122) can receive any data, such as image data, GPS information, and nearby-vehicle information, all of which are obtained from a vehicle or each of vehicles capable of making a communication with each other. The data is communicated to the controller (111). The communication unit (122) can also transfer any data, such as image data, GPS information, and nearby-vehicle information to another or other vehicles. The data may be basic data described herein below.

The GPS unit (123) can obtain information on position or geolocation of the vehicle (101) itself and time information, according to a technique known in the art. The obtained information from the GPS unit (123) can be stored into the memory (141).

The ECU (124) may be any vehicle control system, such as a braking control system, throttle control system, steering control system, body control system. The ECU (124) includes an advanced driver assistance system or ADAS functions that automate, adapt, or enhance vehicle systems in order to increase vehicle safety and/or operator driving performance. For example, the ECU (124) may include ADAS technologies that alert the driver to potential problems or to avoid collisions by implementing safeguards, such as autonomously controlling the vehicle (101). The ECU (124) may also include ADAS features that enhance certain systems, such as automated lighting, automated parking, adaptive cruise control, automated braking, or improved blind spot elimination using camera technology. The ECU (124) can also parse commands an action, such as an ADAS function in order to process the image data, the information on position and the any data obtained from another or other vehicles.

The memory (141) can store any data, such as control logic, instructions, image data, nearby-vehicle information, information on position, lookup tables.

The processor (142) is configured to execute the control logic or instructions. The controller (111) may have additional processors or additional integrated circuits in communication with the processor (142), such as perception logic circuits for analyzing the visual data or dedicated V2V circuits.

The vehicle (101) may further receive image data obtained from the on-vehicle camera (121) via the input/output peripherals or ports (131), and nearby-vehicle information obtained from the processor (142) via the input/output peripherals or ports (131).

The vehicle (101) may further comprise display unit (not shown), which can present display data generated according to an embodiment of the present invention.

Figure 1B:
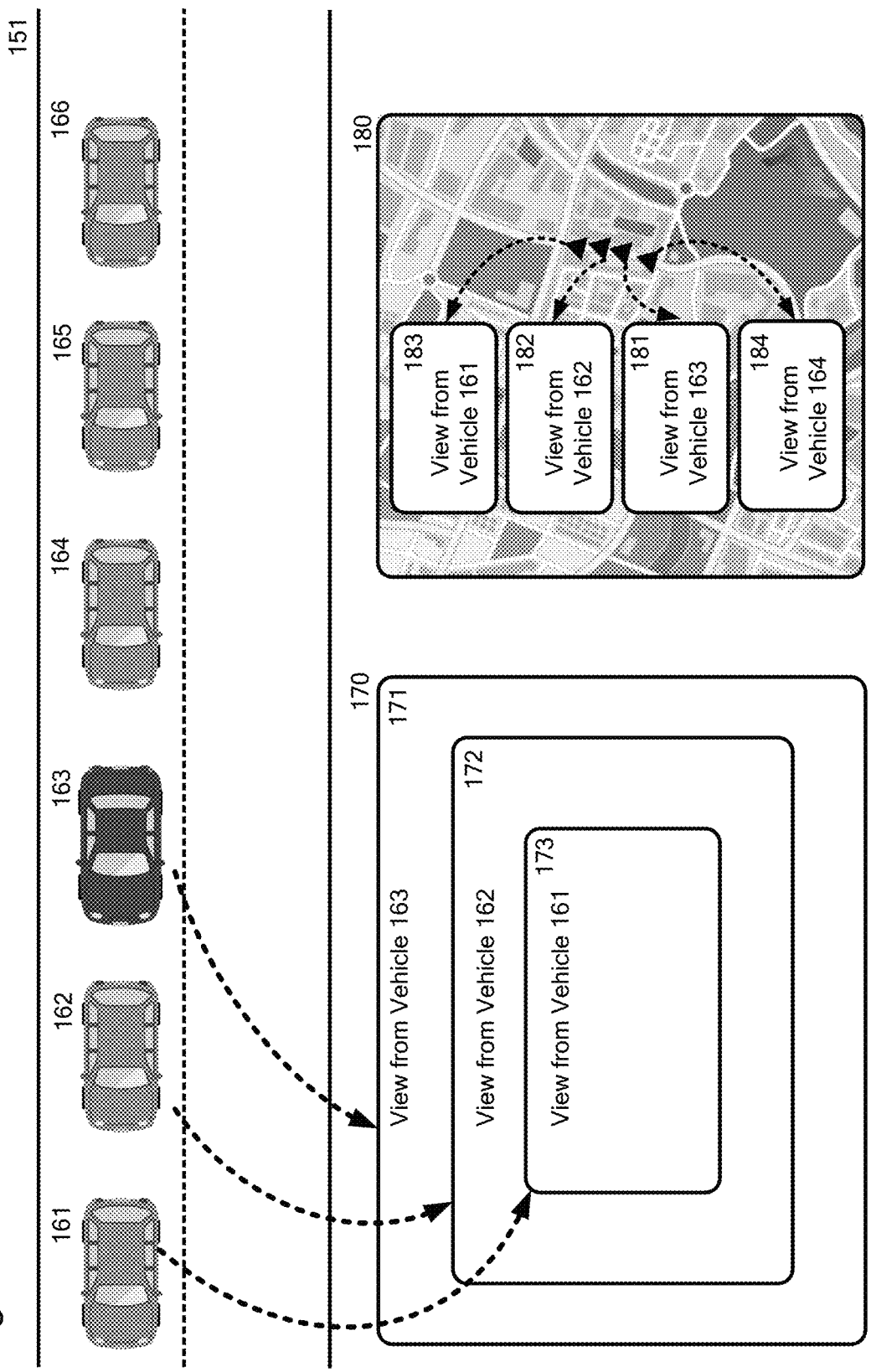
FIG. 1B illustrates an exemplified diagram of presenting in real-time display data comprising image data, which is an object of an embodiment of the present invention.

With reference now to FIG. 1B, FIG. 1B illustrates an exemplified diagram of presenting in real-time display data comprising image data, which is one object of an embodiment of the present invention.

The exemplified diagram (151) shows that plural vehicles (161 to 166) are now traveling on a lane. Each of Vehicles (161 to 166) has the on-vehicle camera (121) and the communication unit (122).

Each of Vehicles (161 to 166) can successively take image using the on-vehicle camera (121), store the image as image data into the memory (141), and then transfer the image data to other vehicles.

According to one embodiment of the present invention, Vehicle (163) can present display data (170) on a display device of Vehicle (163). The display data (170) comprises a view (173) from Vehicle (161) and a view (172) from Vehicle (162) in addition to a view (171) from Vehicle (163) itself. Accordingly, a person including a driver in Vehicle (163) can see, in real time, the view from Vehicle (161) which is traveling two vehicles ahead of Vehicle (163) itself and the view from Vehicle (162) which is traveling ahead of Vehicle (163) itself.

According to another embodiment of the present invention, Vehicle (163) can present display data (180) on the display device of Vehicle (163). The display data (180) comprises an electronic map and further comprises a view (183) from Vehicle (161) and a view (182) from Vehicle (162) in addition to a view (181) from Vehicle (163) itself which is displayed on the electronic map. Further, the display data (180) may comprise a view (184) from Vehicle (164) which is displayed on the electronic map. Accordingly, a person including a driver in Vehicle (163) can see, in real time, the view (183) from Vehicle (161) which is traveling two vehicles ahead of Vehicle (163) itself and the view (182) from Vehicle (162) which is traveling ahead of Vehicle (163) itself. Further, if the display data (180) comprises a view (184) from Vehicle (164), the person in Vehicle (163) can see, in real time, the view (184) from Vehicle (164) which is traveling behind Vehicle (163) itself.

In order to implement the aforementioned one embodiment and the aforementioned another embodiment of the present invention, the details will be explained hereinbelow by referring to the remaining Figures.

Figure 2:
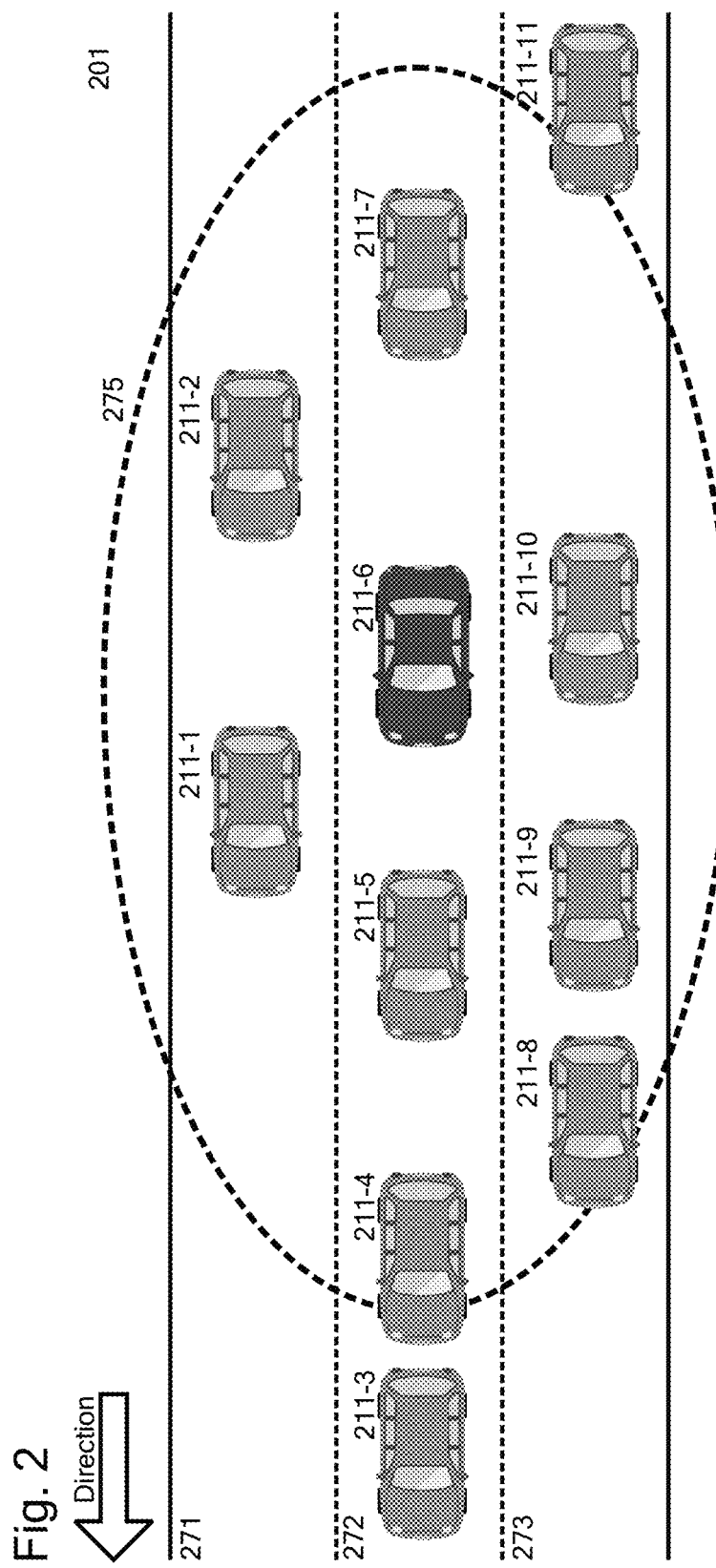
FIG. 2 illustrates an exemplified diagram of vehicles which may be used in an embodiment of the present invention and further an exemplified diagram of defining a group comprising vehicles.

With reference now to FIG. 2, FIG. 2 illustrates an exemplified diagram of vehicles which may be used in an embodiment of the present invention and further an exemplified diagram of defining a group comprising vehicles.

The exemplified diagram (201) shows that plural vehicles (211-1 to 211-11) are now traveling on each of three lanes (271, 272 and 273).

Each of Vehicles (211-1 to 211-11) has the on-vehicle camera (121) and the communication unit (122). Each of Vehicles 211-1 to 211-11) can successively take image using the on-vehicle camera (121), store the image as image data into the memory (141), and then transfer the image data to other vehicles.

The image data can be transferred to an area where a communication is available using the communication unit (122).

Accordingly, in one embodiment, the transfer of image data can be performed in an area where a communication is available; and in another embodiment, the transfer of image data can be performed in an area where a communication is available and further between the area and another area which is different from the area, using a group comprising vehicles.

In the aforementioned one embodiment of the present invention, the transfer of image data can be performed without using a group comprising vehicles.

Let us suppose that Vehicle (211-6) is now focused for explaining the aforementioned one embodiment of the present invention. The dot line (275) indicates an area in which Vehicle (211-6) can communicate with each other. Therefore, the image data transferred from Vehicle (211-6) can be received by Vehicles (211-1 and 211-2 on the lane (271), 211-4, 211-5 and 211-7 on the lane (272), and 211-8, 211-9 and 211-10 on the lane (273). The transfer can be made, for example, by broadcasting the image data. Meanwhile, the image data transferred from Vehicle (211-6) cannot be received by Vehicles (211-3 on the lane (272) and 211-11 on the lane (273)). Accordingly, the aforementioned one embodiment of the present invention can be done by vehicles, i.e. Vehicles (211-1, 211-2, 211-4, 211-5, 211-7, 211-8, 211-9 and 211-10), without defining a group as mentioned in the following another embodiment of the present invention.

The details of the aforementioned one embodiment of the present invention will be explained hereinbelow by referring to the following FIGS. 3A and 3B, and FIG. 4A.

In the aforementioned another embodiment of the present invention, the transfer of image data can be performed by using a group comprising vehicles.

Let us suppose that Vehicle (211-6) is now focused for explaining the aforementioned another embodiment. Vehicle (211-6) may have an ability to define a group to which the image data from Vehicle (211-6) can be transferred. In order to define the group, Vehicle (211-6) can act as a host vehicle. Vehicle (211-6) can define the group comprising Vehicles (211-1, 211-2, 211-4, 211-5, 211-7, 211-8, 211-9 and 211- 10). The group can be illustrated with the dot line (275). Each of other vehicles (211-1, 211-2, 211-4, 211-5, 211-7, 211-8, 211-9 and 211-10) in the group can act as a member vehicle. Another or other groups can be defined similarly by another or other vehicles which can be act as a host vehicle. Any known method known in the art can be used for defining a group. Accordingly, the aforementioned another embodiment of the present invention can be done by the group or between or among groups.

Please note that vehicles which belong to each of the groups are dynamically changed. This is because each vehicle is traveling dynamically, for example, by changing a lane on a road, by changing a direction, by stopping due to a traffic signal or traffic jam.

The details of the aforementioned another embodiment of the present invention will be explained hereinbelow by referring to the following FIGS. 3A and 3B, and FIG. 4B.

Figure 3B:
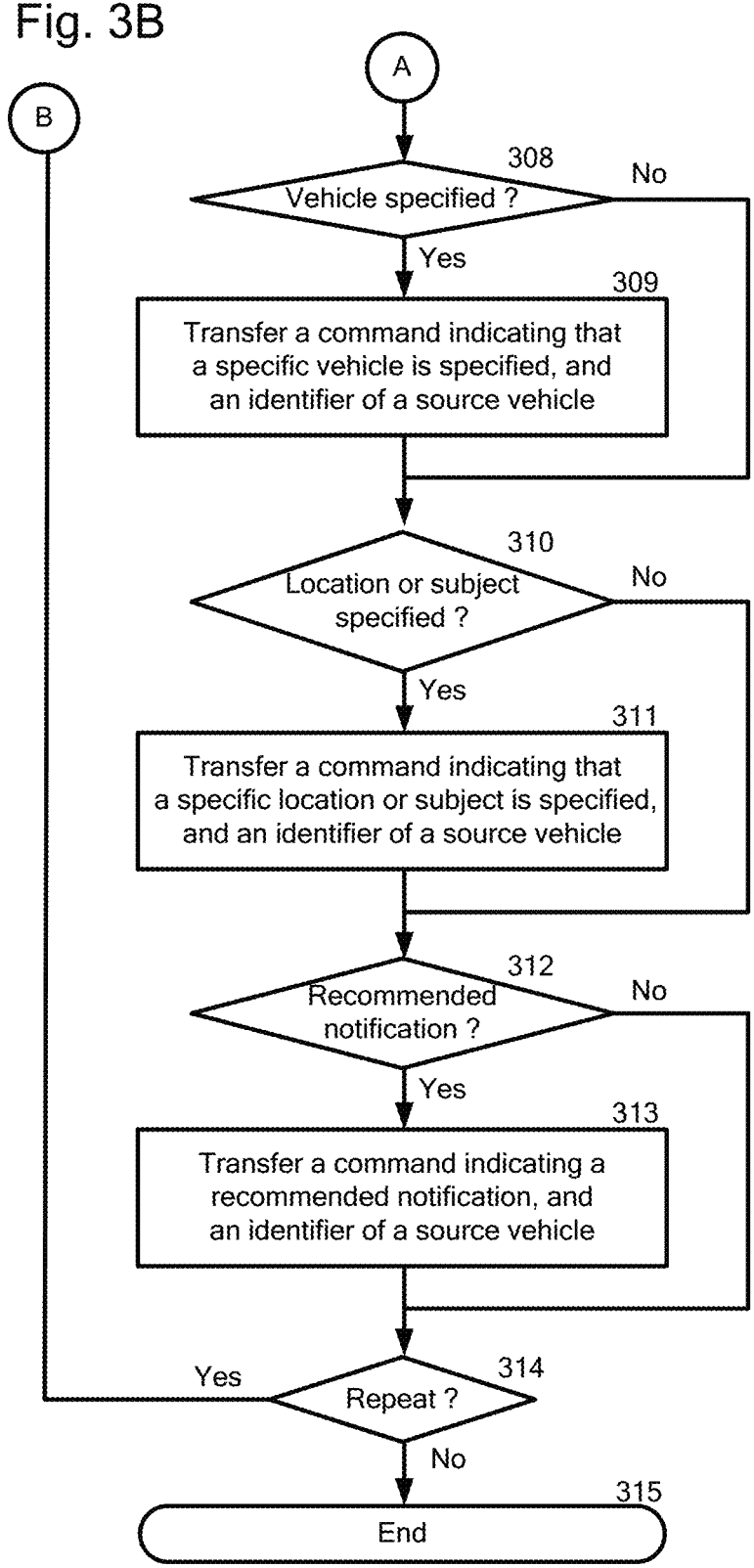

With reference now to FIGS. 3A and 3B, FIGS. 3A and 3B illustrate an embodiment of exemplified flowchart of a process for transferring image data taken by an on-vehicle camera of a vehicle.

The vehicle corresponds to the vehicle (101) illustrated in FIG. 1A.

In the following, the aforementioned one embodiment of the present invention explained in FIG. 1B will be first explained. In this embodiment, the transfer of image data can be performed without using a group comprising vehicles.

In this embodiment, each of vehicles may generate basic data. The basic data may comprise, for example, the following (1) to (6).

(1) A set of own vehicle information and nearby-vehicle information: The own vehicle information may be, for example, but not limited to letters, numbers or combination thereof on an own vehicle number plate, such as a car number plate or the number of vehicle ID; any other unique identifiers of an own vehicle; an IP address associated with an own vehicle; or any other unique identifiers. Similarly, the nearby-vehicle information may be, for example, but not limited to letters, numbers or combination thereof on a vehicle number plate, such as a car number plate; any other unique identifiers of a vehicle obtained from the on-vehicle camera (121); an IP address associated with a vehicle; or any other unique identifiers. The set of own vehicle information and nearby-vehicle information can be used for generating information on a line of vehicles.

(2) Image data: The image data comprises, for example, image data itself taken by the on-vehicle camera (121) or processed data based on image data itself taken by the on-vehicle camera (121): the image data can be used for generating display data.

(3) Information on position or geolocation of the vehicle: This information may comprise coordinates, direction, height or altitude, or combination thereof. This information can be obtained by a GPS unit, a gyro sensor, an altitude sensor, or a combination thereof. This information can be used for generating display data.

(4) Data identifier: The data identifier shall be a unique between or among different vehicles so that the data identifier may be a combination of a vehicle identifier with an unique identifier such as an identifier of the image data, information on a time when image data was taken by an on-vehicle camera, consecutive numbers, travel distance of its vehicle, or a combination of these; or made based on the vehicle identifier and the aforesaid unique identifier. The data identifier embedded in basic data can be used in each vehicle for verifying whether newly received data has been already received or not.

(5) Time stamp: The time stamp indicates a time when image data was taken by an on-vehicle camera. The time stamp also indicates a time roughly equivalent to a time when basic data was generated, because the basic data was generated in response to the image data being taken. The time stamp can be used for generating display data. For example, the time stamp can be used for the purpose of showing the information of a time that the image data was taken; or for the purpose of not showing image data of which time stamp is older.

(6) Information on a road position on an electronic map: The information may comprise, for example, node information on the electronic map: This information can be generated based on data obtained by GPS or any sensor such as a gyro sensor, an altitude sensor, or a combination thereof. This information can be used for generating display data.

In this embodiment, steps 301 to 315 mentioned below may be performed by a vehicle which can present display data (hereinafter, in this embodiment, simply referred to as "the vehicle").

In step 301, the vehicle starts the aforementioned process.

In step 302, the vehicle receives, from each of vehicles capable of making a communication with each other, via vehicle networks, basic data, including image data and nearby-vehicle information. The basic data can be successively transferred from each of the vehicles.

In step 303, the vehicle receives for example, image data which was obtained from the on-vehicle camera (121), and information on position or geolocation of the vehicle which was obtained from the GPS unit (123). The vehicle generates basic data, based on the image data and the information on position, and then transfers the basic data to another or other vehicles via the communication unit (122). The transfer may be made, for example, by broadcasting the basic data.

Steps 302 and 303 can be performed simultaneously or interchangeably.

In step 304, the vehicle generates a set of information on a line of vehicles, based on the nearby-vehicle information.

In step 305, the vehicle associates the image data with the information on a line of vehicles.

In an optional step 306, the vehicle generates display data, using the image data. The display data can be generated according to a default setting made by an administrator or a setting made by a user.

In an optional step 307, the vehicle presents the display data on a display device in the vehicle. In one embodiment, the display data is generated by combining image from a plurality of image data, combined image which includes two or more image from a plurality of image data, or a combination of these or by superimposing images from a plurality of image data. In another embodiment, the display data is generated by combining one or more images from a plurality of image data with an electronic map.

The vehicle can present the display data, for example, on as area with flat or substantially flat and no shade on a front glass of a vehicle; on a display device of a car navigation system; on a display device embedded in or attached to the front panel of a vehicle; or on a display device embedded in or attached to a backside of a seat.

In an optional step 308, the vehicle judges whether the vehicles receives information on a user selection of a specific vehicle via a user operation performed on a display device or voice command or not. The selected vehicle can be another vehicle different from the vehicle of the user, or the own vehicle. If the judgment is positive, the vehicle proceeds to step 309. Meanwhile, if the judgment is negative, the vehicle proceeds to step 310.

In an optional step 309, the vehicle transfers, to another or other vehicles, a command indicating that a specific vehicle is specified, and optionally the number of hops. The command may comprise information that the selected vehicle can be another vehicle different from the vehicle of the user, or the own vehicle. If another or other vehicles receive this command, this another or other vehicles can transfer the command to the specified vehicle. In a case where the specified vehicle receives the command, the specified vehicle will transfer, to another vehicle or other vehicles, the image data having the data identifier of the specified vehicle. In a case where the specified vehicle is the own vehicle, image data taken by a vehicle which is immediately ahead of or behind the own vehicle will be transferred to another vehicle or other vehicles.

In an optional step 310, the vehicle judges whether the vehicles receives information on a user selection of a specific location or specific subject, via a user operation performed on a display device or voice command or not. If the judgment is positive, the vehicle proceeds to step 311. Meanwhile, if the judgment is negative, the vehicle proceeds to step 312.

In an optional step 311, the vehicle transfers, to another or other vehicles, a command indicating that a specific location or specific subject is specified, and optionally the number of hops. If another or other vehicle receives this command, this another or other vehicles can transfer the command to a vehicle which takes or took the image of the specified location or specified subject. In a case where this vehicle which takes or took the image of the specified location or specified subject or which is traveling close to the specified location or specified subject receives the command, this vehicle will transfer, to another vehicle or other vehicles, the image data taken by an on-vehicle camera of this vehicle. The image data may have the image of the specified location or specified subject.

In an optional step 312, the vehicle judges whether the vehicles receives information on a user selection of a recommended notification, via a user operation performed on a display device or voice command or not. If the judgment is positive, the vehicle proceeds to step 313. Meanwhile, if the judgment is negative, the vehicle proceeds to step 314.

In an optional step 313, the vehicle transfers, to another or other vehicles, a command indicating a recommended notification, and optionally the number of hops. The recommended notification may include that a specific vehicle is specified as a recommendation or that a specific location or specific subject is specified as a recommendation. The specific vehicle may comprise own vehicle. If another or one among other vehicles receives this command and is traveling immediately behind the specified vehicle or source vehicle, this another or the aforesaid one vehicle can transfer, to another vehicle or other vehicles, the image data taken by an on-vehicle camera of this another or the aforesaid vehicle. This another or the aforesaid vehicle may be a vehicle which is traveling ahead of or behind the specified vehicle. This image data may comprise a view of backside of the source vehicle.

In an optional step 314, the vehicle judges whether the vehicles repeats the process of steps 302 to 313 or not. If the judgment is positive, the vehicle proceeds back to step 302. Meanwhile, if the judgment is negative, the vehicle proceeds to a final step 315.

For example, if the vehicle successively receives data from each of vehicles capable of making a communication with each other via vehicle networks, the vehicle determines that the judgment is positive.

In step 315, the vehicle terminates the aforementioned process.

In the repetition of steps 302 to 313, the vehicle updates the set of information on a line of vehicles, based on the newly received nearby-vehicle information, further associates the newly received image data with the updated information of a line of vehicle, and then updates the display data. In other words, it can be generally said that the information on the line of vehicles is updated based on the transferred nearby-vehicle information, and the transferred image data is associated with the updated information on the line of vehicles. Therefore, the vehicle generates the updated display data, based on the image data. Then, the vehicle presents, on a display device of a vehicle in real time, the display data comprising image data which is being successively sent from the aforementioned each of vehicles.

In the following, the aforementioned another embodiment of the present invention explained in FIG. 1B will be next explained. In this embodiment, the transfer of image data can be performed by using a group comprising vehicles.

In this embodiment, as explained by referring to FIG. 2, a group comprising a plurality of vehicles is defined by a host vehicle. Each of vehicles which belongs to the group may generate basic data. The basic data may comprise, for example, the aforementioned (1) to (6).

In this embodiment, steps 301 to 315 mentioned below may be performed by a vehicle which can present display data and belongs to a group (hereinafter, in this embodiment, simply referred to as "the vehicle"). The vehicle may a host vehicle or member vehicle of the group.

In step 301, the vehicle starts the aforementioned process.

In step 302, the vehicle receives, from each of vehicles which belongs to this group (hereinafter, in this embodiment, referred to as "the first group"), via vehicle networks, basic data, including image data and nearby-vehicle information.

If a vehicle which belongs to the first group (hereinafter, in this embodiment, referred to as "the first vehicle") belongs also to another group (hereinafter, in this embodiment, referred to as "the second group"), the first vehicle receives basic data from all of the other vehicles which belong to the second group, and then transfers the received basic data to all of the other vehicles which belongs to the first group. Accordingly, the vehicle which is the subject of step 302 can receive the basic data transferred from each of all of the other vehicles which belong to the second group.

Similarly, if a vehicle which belongs to the second group (hereinafter, in this embodiment, referred to as "the second vehicle") belongs also to another group (hereinafter, in this embodiment, referred to as "the third group"), the second vehicle receives basic data from all of the other vehicles which belong to the third group, and then transfers the received basic data to all of the other vehicles which belongs to the second group. Accordingly, the first vehicle can receive the basic data transferred from each of all of the other vehicles which belong to the third group. Consequently, a vehicle which belongs to both of the first and second groups transfers the basic data to other vehicles which belong to the first group. The vehicle which belongs to both of the first and second groups may be the first vehicle or a vehicle other than the first vehicle. This is because member vehicles of the first group can be dynamically changed. Accordingly, the vehicle which is the subject of step 302 can receive the basic data transferred from each of all of the other vehicles which belong to the third group.

Similarly, if a vehicle which belongs to the second group (hereinafter, in this embodiment, referred to as "the second vehicle") belongs also to other groups, the second vehicle receives basic data from all of the other vehicles which belong to each of this other groups, and then transfers the received basic data to all of the other vehicles which belongs to the second group. Accordingly, the first vehicle can receive the basic data transferred from each of all of the other vehicles which belong to each of this other groups. Consequently, a vehicle which belongs to both of the first and second groups transfers the basic data to other vehicles which belong to the first group. The vehicle which belongs to both of the first and second groups may be the first vehicle or a vehicle other than the first vehicle. This is because member vehicles of the first group can be dynamically changed. Accordingly, the vehicle which is the subject of step 302 can receive the basic data transferred from each of all of the other vehicles which belong to each of all of the other vehicles which belong to each of this other groups.

The image data and nearby-vehicle information can be successively transferred from each of the vehicles in each of groups.

Steps 303 to 315 are the same as those explained above. Accordingly, the overlapping explanation of steps 303 to 315 will be omitted herein.

Further, in step 309, if the specified vehicle belongs to another group which is different from the first group, the command will be transferred between or among groups until the command is transferred to a group to which the specified vehicle belongs.

Further, in step 311, if a vehicle which takes or took the image of the specified location or specified subject belongs to another group which is different from the first group, the command will be transferred between or among groups until the command is transferred to a group to which this vehicle belongs.

Further, in step 313, if a vehicle which is traveling immediately behind the specified own vehicle belongs to another group which is different from the first group, the command will be transferred between or among groups until the command is transferred to a group to which this vehicle which is traveling immediately behind the specified own vehicle belongs.

Figure 4B:
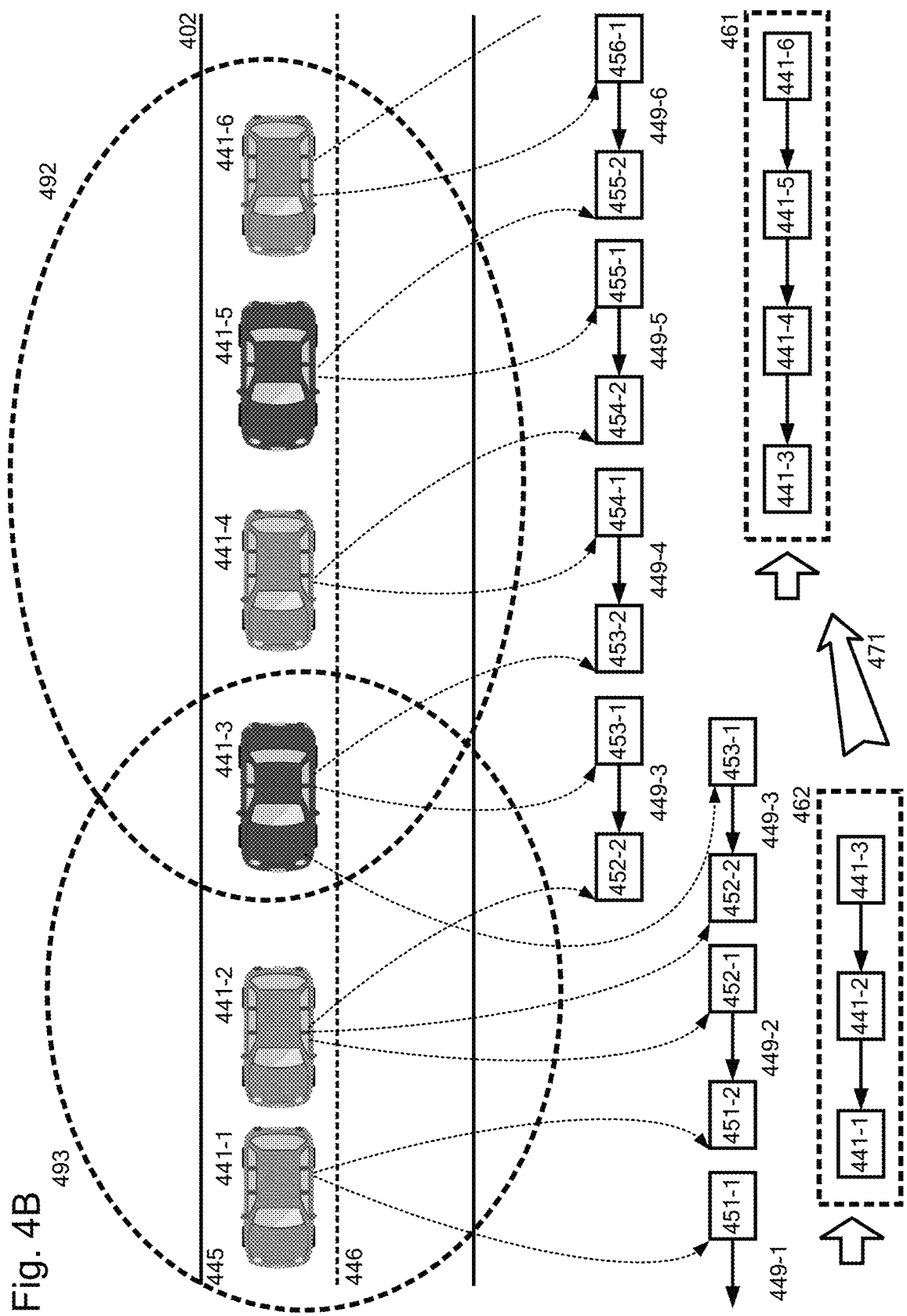

FIGS. 4A and 4B illustrate an embodiment of exemplified diagrams of generating basic data, transferring basic data, and generate information on a line of vehicles.

With reference now to FIG. 4A, FIG. 4A illustrates an embodiment of an exemplified diagram of generating basic data, transferring basic data to an area where a communication is available, and generating information on a line of vehicles, based on the basic data.

The exemplified diagram (401) shows that plural vehicles (411-1 to 411-6) are now traveling on one lane (415) and no oncoming vehicle is traveling on another lane.

Each of Vehicles (411-1 to 411-6) takes image using the on-vehicle camera (121), and then stores the image as image data into the memory (141). Further, Each of Vehicles (411-1 to 411-6) generates nearby-vehicle information, for example, using the on-vehicle camera (121) and then combines own vehicle information with nearby-vehicle information to generate a set of own vehicle information and nearby-vehicle information. From the set, the association between a vehicle and a vehicle which is traveling ahead of this vehicle can be found. For example, the set (419-5) which was generated by Vehicle (411-5) comprises own vehicle information (425-1) and nearby-vehicle information (424-2). In this way, each of the sets (419-1, 419-2, 419-3, 419-4, 419-5 and 419-6) are generated. Accordingly, each of the basic data which is had by Vehicles (411-1 to 411-6) comprises each of the sets (419-1, 419-2, 419-3, 419-4, 419-5 and 419-6), respectively.

Each of Vehicles (411-1 to 411-6) transfers the set to other vehicles. The transfer can be made, for example, by broadcasting the image data. The image data can be received by a vehicle which exists in an area where a communication is available (491) using the communication unit (122).

Let us suppose that Vehicle (411-5) is now focused as a vehicle which generates information on a line of vehicles. The dot line (491) indicates an area in which Vehicle (411-5) can communicate with each other.

After the transfer made by each of Vehicles (411-1 to 411-6), Vehicle (411-5) can receive the sets which was transferred from Vehicles (411-3, 411-4 and 411-6).

After the receipt of the sets, Vehicle (411-5) can generate information on a line of vehicles, based on the nearby-vehicle information. The information on the line (431) illustrates the line of vehicles (411-3, 411-4, 411-5 and 411-6 in order).

With reference now to FIG. 4B, FIG. 4B illustrates an embodiment of an exemplified diagram of generating basic data, transferring basic data to an area where a communication is available and between groups, and generate information on a line of vehicles, based on the basic data The exemplified diagram (402) shows that plural vehicles (441-1 to 441-6) are now traveling on one lane (445) and no oncoming vehicle is traveling on another lane.

Each of Vehicles (441-1 to 441-6) takes image using the on-vehicle camera (121), and then stores the image as image data into the memory (141). Further, Each of Vehicles (441-1 to 441-6) generates nearby-vehicle information, for example, using the on-vehicle camera (121) and then combines own vehicle information with nearby-vehicle information to generate a set of own vehicle information and nearby-vehicle information. From the set, the association between a vehicle and a vehicle which is traveling ahead of this vehicle can be found. For example, the set (449-5) which was generated by Vehicle (441-5) comprises own vehicle information (455-1) and nearby-vehicle information (454-2). In this way, each of the sets (449-1, 449-2, 449-3, 449-4, 449-5 and 449-6) are generated. Accordingly, each of the basic data which is had by Vehicles (441-1 to 441-6) comprises each of the sets (449-1, 449-2, 449-3, 449-4, 449-5 and 449-6), respectively.

Each of Vehicles (441-1 to 441-6) transfers the set to other vehicles. The transfer can be made, for example, by broadcasting the image data. The image data can be received by a vehicle which exists in an area where a communication is available (492 and 493, respectively) using the communication unit (122).

Let us suppose that Vehicle (411-5) is now focused as a vehicle which generates information on a line of vehicles. The dot line (492) indicates a group (492) to which Vehicles (441-3, 441-4, 441-5 and 441-6) belong (hereinafter, in this embodiment, referred to as "first group") and an area in which Vehicle (441-5) can communicate with other vehicles (441-3, 441-4 and 441-6). Further, the dot line (493) indicates another group (493) to which Vehicle (441-1, 441-2 and 441-3) belongs (hereinafter, in this embodiment, referred to as "second group") and an area in which Vehicle (441-2) can communicate with other vehicles (441-1 and 441-3). Accordingly, it can be said that the line of vehicles described in FIG. 4B is composed of two groups (492 and 493).

Further, let us suppose that there is Vehicle (441-3) which belongs to the first group (492) and the second group (493). It can be said that each of the first and second groups (492, 493, respectively) may have at least one vehicle commonly belonging to these groups (492 and 493). Vehicle (441-3) can transfer the sets generated by each of Vehicles (441-1 and 441-2) to the first group (492) and further transfer the sets generated by each of Vehicles (441-4, 441-5 and 441-6) to the second group (493).

After the transfer made by each of Vehicles (441-3 to 441-6), Vehicle (441-5) can receive the sets which were transferred from other Vehicles (441-3, 441-4 and 441-6) which belong to the first group (492). After the receipt of the sets, Vehicle (411-5) can generate information on a line of vehicles (461), based on the nearby-vehicle information in the set. The information on the line (461) illustrates the line of vehicles (441-3, 441-4, 441-5 and 441-6 in order).

Similarly, after the transfer made by each of Vehicles (441-1 and 441-2), Vehicle (441-2) can receive the sets which were transferred from other Vehicles (441-1 and 441-2) which belong to the second group. After the receipt of the sets, Vehicle (441-2) or Vehicle (441-3) can generate information on a line of vehicles (462), based on the nearby-vehicle information in the sets. The information on the line (462) illustrates the line of vehicles (441-1, 441-2 and 441-3 in order).

As mentioned above, Vehicle (441-3) belongs to both of the first group (492) and the second group (493). Accordingly, Vehicle (441-3) transfers the sets which were transferred from other Vehicles (441-1 and 441-2) to all of other vehicles (441-4, 441-5 and 441-6) which belong to the first group (492). Alternatively, Vehicle (441-3) transfers (471) the information on a line of vehicles (462) to all of the other Vehicles (441-4, 441-5 and 441-6) which belongs to the first group (492).

After receipt of the sets from Vehicle (441-3), Vehicle (441-5) updates the information on a line of vehicles (461), using the received sets. Alternatively, after receipt of the information on a line of vehicles (462) from Vehicle (441-3), Vehicle (441-5) updates the information on a line of vehicles (461), using the information on a line of vehicles (462), for example, by combining the information on the line (461) with the information on a line of vehicles (462).

Accordingly, the updated information on the line of vehicles (441-1, 441-2, 441-3, 441-4, 441-5, 441-5 and 441-6 in order, not shown) is generated.

According to this embodiment, it can be said that the line of vehicles is in general composed of a plurality of groups, and each of the groups has at least one vehicle commonly belonging to two or more groups among the plurality of groups, and the at least one vehicle transfers the image data and the nearby-vehicle information to the two or more groups.

Figure 5A:
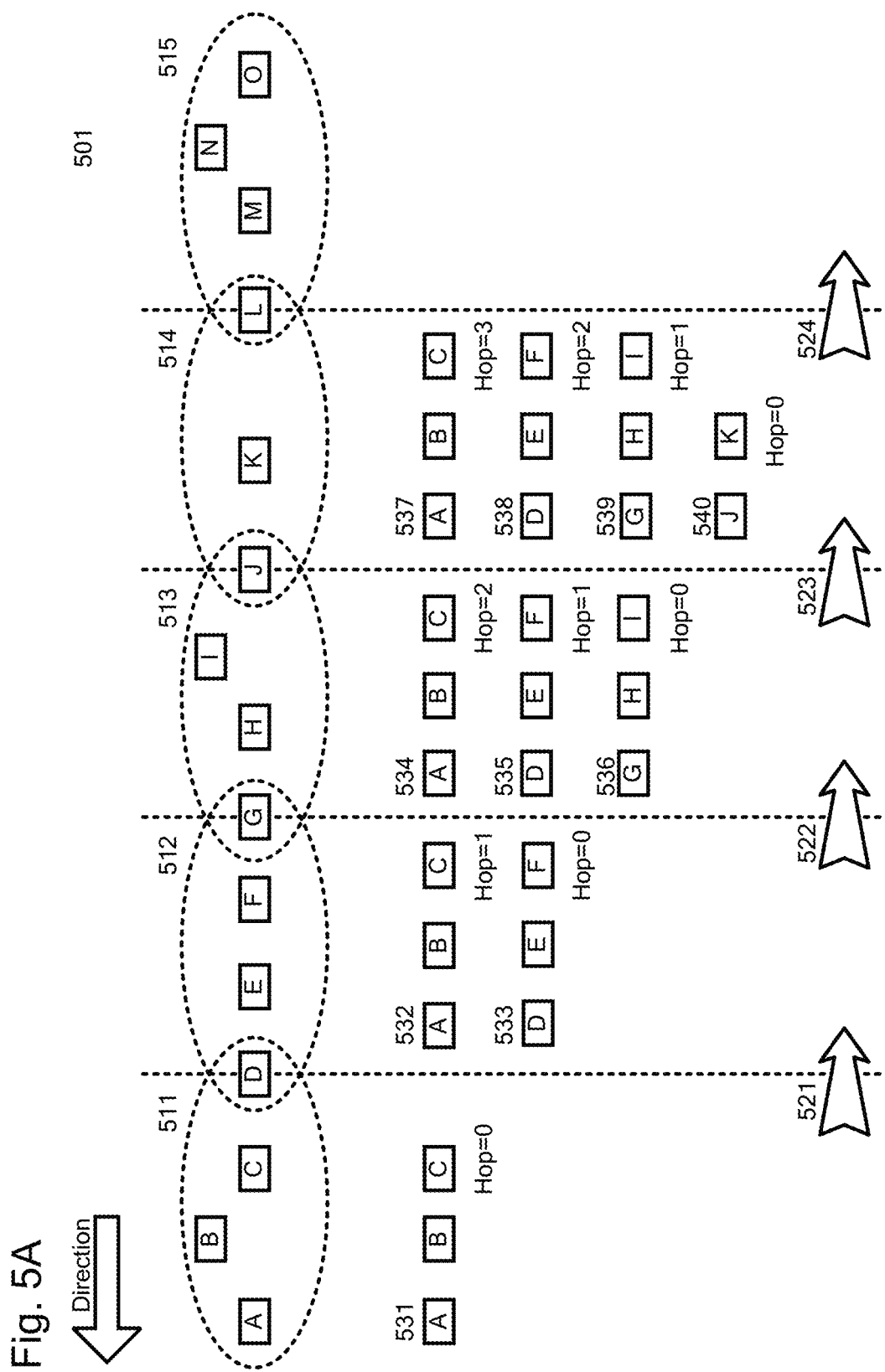
FIGS. 5A and 5B illustrate an embodiment of exemplified diagrams of transferring basic data and transferring the basic data.
Figure 5B:
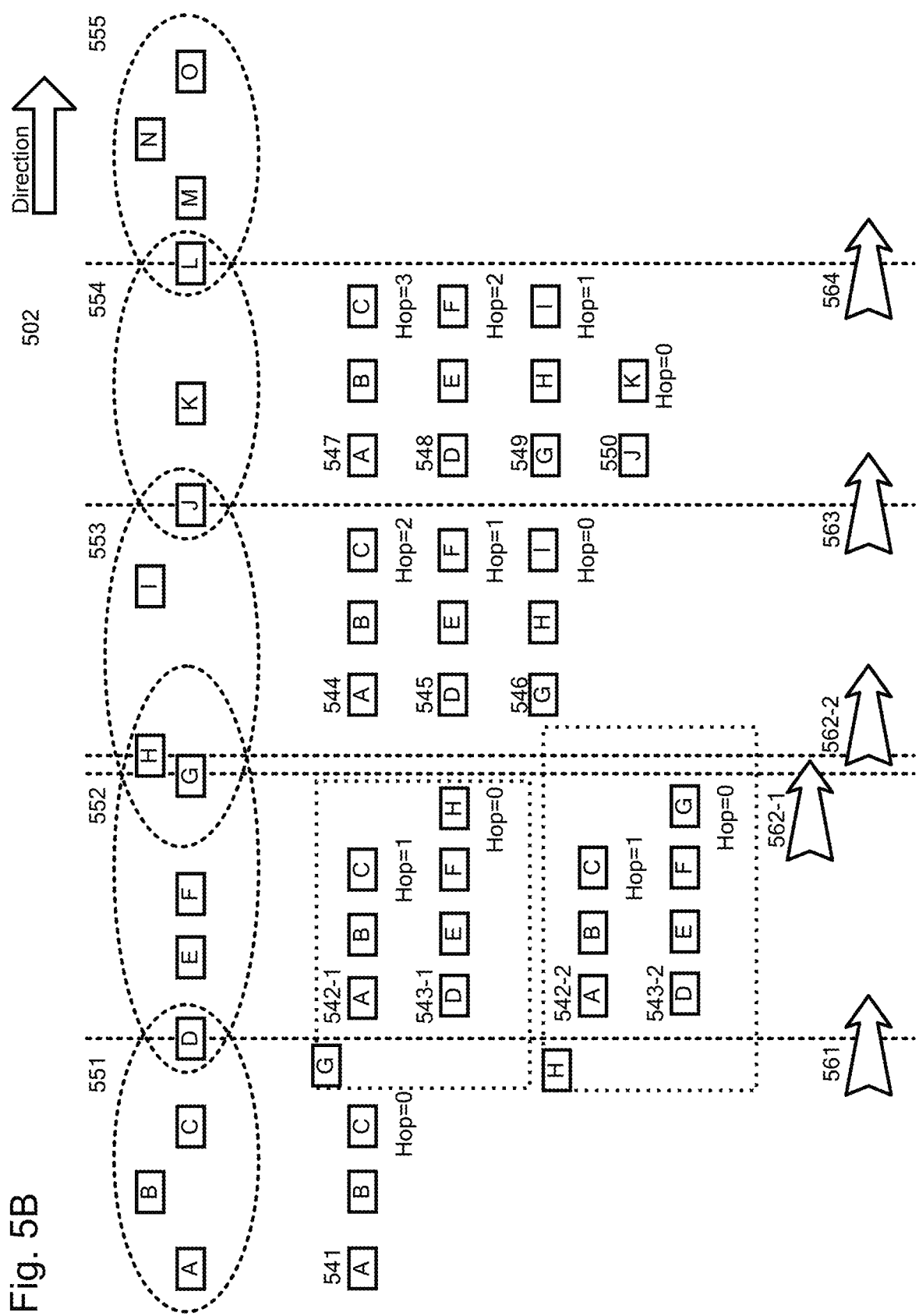

FIGS. 5A and 5B illustrate an embodiment of exemplified diagrams of transferring basic data and transferring the basic data between groups.

With reference now to FIG. 5A, FIG. 5A illustrates one embodiment of an exemplified diagram of transferring basic data between groups in which a frequency of the transfer of the image data is changed or the number of the image data is thinned-out according to the number of hops.

The exemplified diagram (501) shows that Vehicles A to O are now traveling on two lanes and no oncoming vehicle on opposite lanes. Further, the exemplified diagram (501) shows that five groups (511 to 515) are defined according to the description of FIG. 4B.

Let us suppose that Vehicle M which belongs to the group (515) is now focused as a vehicle which generates information on a line of vehicles. In this embodiment, the number of hops is used in order to thin-out the number of the image data or to change a frequency of the transfer of the image data. The number of hops can be had by basic data and initially set as zero.

Let us suppose that there is Vehicle D which belongs to both groups (511 and 512). At the time when Vehicle D transfers (521) the basic data A, B and C (531) to all of other vehicles which belongs to the group (512), the number of hops is incremented to one. Please note that Vehicle D does not transfer the basic data D, because the basic data D can be transferred in the group (512) as long as Vehicle D belongs to the group (512). This note applies also to the following transfer.

Similarly, there is Vehicle G which belongs to both groups (512 and 513). At the time when Vehicle G transfers (522) the basic data A, B and C (532) to all of other vehicles which belongs to the group (513), the number of hops is incremented to two. Further, at the time when Vehicle G transfers (522) the basic data D, E and F (533) to all of other vehicles which belongs to the group (513), the number of hops is incremented to one.

Similarly, there is Vehicle J which belongs to both groups (513 and 514). At the time when Vehicle J transfers (523) the basic data A, B and C (534) to all of other vehicles which belongs to the group (514), the number of hops is incremented to three. Further, at the time when Vehicle J transfers (523) the basic data D, E and F (535) to all of other vehicles which belongs to the group (514), the number of hops is incremented to two. Further, at the time when Vehicle J transfers (523) the basic data G, H and I (536) to all of other vehicles which belongs to the group (514), the number of hops is incremented to one.

The similar manner applies also to the transfer of the basic data A, B and C (537), the basic data D, E and F (538), the basic data G, H and I (539), and the basic data J and K (540).

Depending on the number of hops, a frequency of the transfer of the basic data to be transferred to a next group is made to be lowered in the transfer. For example, if the number of hops is one, the transfer can be done at 500 ms intervals; if the number of hops is two or three, the transfer can be done at 1 second intervals. That is, as the number of hops increases, a frequency of the transfer may decrease. A frequency of the transfer can be arbitrary set.

Alternatively, depending on the number of hops, the number of image data to be transferred to a next group is made to be reduced in the transfer. For example, if the number of hops is 5 to 9, one out of two image data is transferred, i.e. a half of the number of image data to be transferred is transferred; if the number of hops is ten to nineteen, one out of four image data is transferred, i.e. 25% of the number of image data to be transferred is transferred. That is, as the number of hops increases, the number of the image data to be transferred may decrease. The number of image data to be transferred can be arbitrary set.

With reference now to FIG. 5B, FIG. 5B illustrates another embodiment of an exemplified diagram of transferring basic data between groups in which a frequency of the transfer of the image data is changed or the number of the image data is thinned-out according to the number of hops.

The exemplified diagram (502) shows that Vehicles A to O are now traveling on two lanes and no oncoming vehicle on opposite lanes. Further, the exemplified diagram (502) shows that five groups (551 to 555) are defined according to the description of FIG. 4B.

Let us suppose that Vehicle M which belongs to the group (555) is now focused as a vehicle which generates information on a line of vehicles. In this embodiment, the number of hops is used in order to thin-out the number of the image data or to change a frequency of the transfer of the image data. The number of hops can be had by basic data and initially set as zero.

Let us suppose that there is Vehicle D which belongs to both groups (551 and 552). At the time when Vehicle D transfers (561) the basic data A, B and C (541) to all of other vehicles which belongs to the group (552), the number of hops is incremented to one. Please note that Vehicle D does not transfer the basic data D, because the basic data D can be transferred in the group (552) as long as Vehicle D belongs to the group (552). This note applies also to the following transfer.

Similarly, there are Vehicle G and H both of which belong to both groups (552 and 553). At the time when Vehicle G transfers (562-1) the basic data A, B and C (542-1) to all of other vehicles which belongs to the group (553), the number of hops is incremented to two. Further, at the time when Vehicle G transfers (562-1) the basic data D, E, F and H (543-1) to all of other vehicles which belongs to the group (553), the number of hops is incremented to one. At the time when Vehicle H transfers (562-2) the basic data A, B and C (542-2) to all of other vehicles which belongs to the group (553), the number of hops is incremented to two. Further, at the time when Vehicle G transfers (562-2) the basic data D, E, F and G (543-1) to all of other vehicles which belongs to the group (553), the number of hops is incremented to one.

In the aforementioned transfers (562-1 and 562-2), the basic data A, B and C (542-1) is transferred by Vehicle G, and the basic data A, B and C (542-2) is also transferred by Vehicle H. Accordingly, all of other vehicles besides Vehicles G and H which belongs to the group (553) receive the basic data A, B and C twice. However, in this situation, the basic data having the same data identifier is deleted or ignored. Accordingly, one of the basic data among the basic data A, B and C (542-1) and the basic data A, B and C (542-2) is deleted or ignored by this all of other vehicles besides Vehicles G and H.

Similarly, there is Vehicle J which belongs to both groups (553 and 554). At the time when Vehicle J transfers (563) the basic data A, B and C (544) to all of other vehicles which belong to the group (554), the number of hops is incremented to three. Further, at the time when Vehicle J transfers (563) the basic data D, E and F (545) to all of other vehicles which belong to the group (554), the number of hops is incremented to two. Further, at the time when Vehicle J transfers (563) the basic data G, H and I (546) to all of other vehicles which belong to the group (554), the number of hops is incremented to one.

The similar manner applies also to the transfer of the basic data A, B and C (547), the basic data D, E and F (548), the basic data G, H and I (549), and the basic data J and K (550).

Figure 6A:
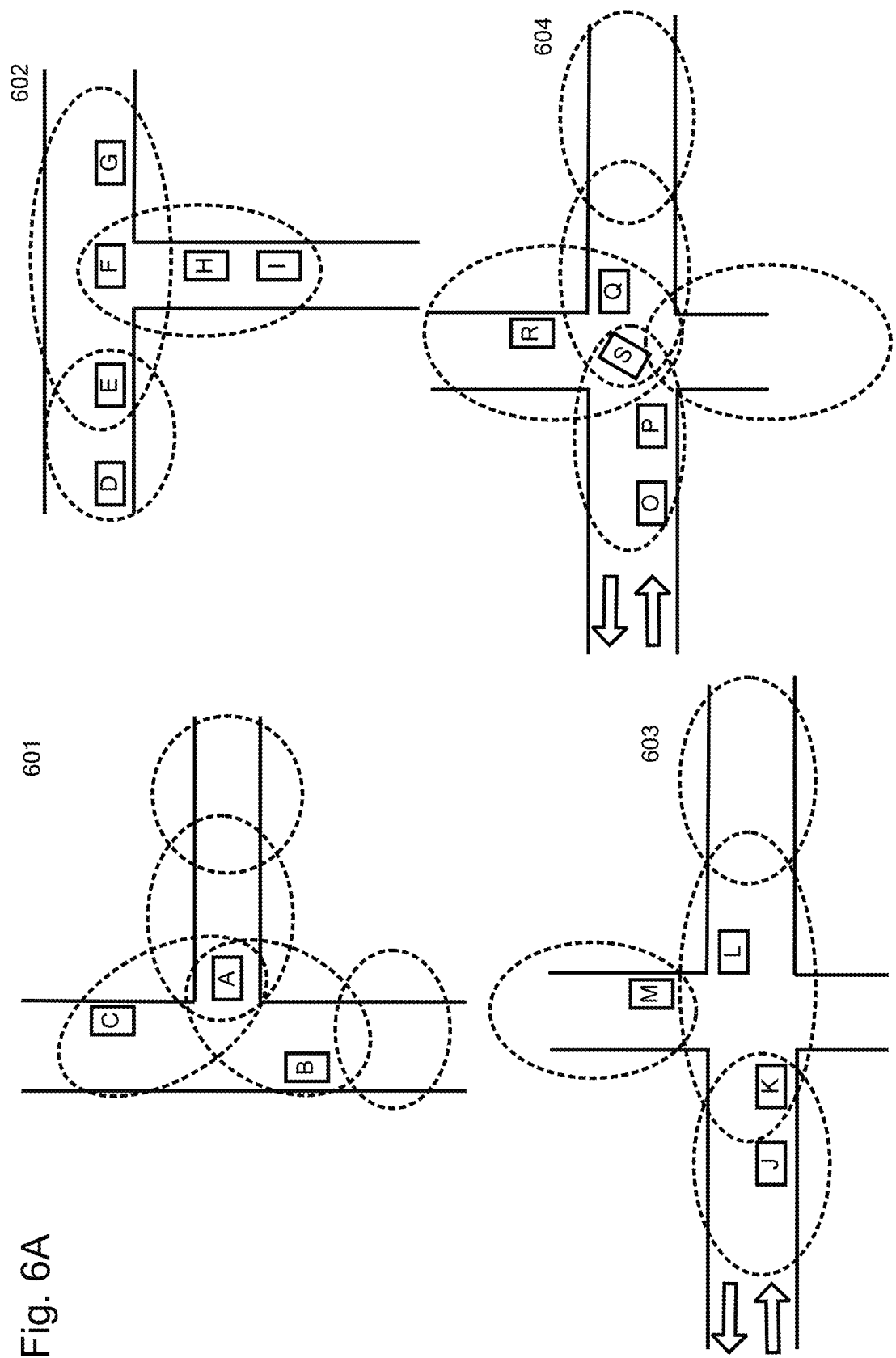

FIGS. 6A and 6B illustrate an embodiment of exemplified diagrams of transferring basic data and transferring the basic data between or among groups.

With reference now to FIG. 6A, FIG. 6A illustrates one embodiment of an exemplified diagram of transferring basic data between or among groups, each of which is defined on various patterns of roads.

The exemplified diagram (601) shows that Vehicles A to C are now traveling on a road including a bifurcation.

Vehicle A belongs to three groups. Accordingly, Vehicle A can transfer the basic data from each of all of the other vehicles which belong to each of three groups to each of all of the other vehicles which belong to each of the other two groups. Accordingly, for example, the basic data of Vehicle B can be transferred, via Vehicle A, to Vehicle C which is traveling on the opposite lane.

The exemplified diagram (602) shows that Vehicles D to I are now traveling on a road including a side road. Vehicle F belongs to two groups. Accordingly, Vehicle F can transfer the basic data from each of all of the other vehicles which belong to each of two groups to each of all of the other vehicles which belong to another group. Accordingly, for example, the basic data of Vehicle D can be transferred, via Vehicle E, to Vehicles F and G; and via Vehicle F, to Vehicles H and I.

The exemplified diagram (603) shows that Vehicles J to M are now traveling on a road including an intersection. Vehicle K belongs to two groups. Accordingly, Vehicle K can transfer the basic data from each of all of the other vehicles which belong to each of two groups to each of all of the other vehicles which belong to another group. Accordingly, for example, the basic data of Vehicle J can be transferred, via Vehicle K, to Vehicle L which is traveling on the opposite lane.

The exemplified diagram (604) shows that Vehicles O to S are now traveling on a road including an intersection. Vehicle S belongs to three groups. Accordingly, Vehicle S can transfer the basic data from each of all of the other vehicles which belong to each of three groups to each of all of the other vehicles which belong to each of other groups. Accordingly, for example, the basic data of Vehicle O can be transferred, via Vehicle S, to Vehicles R and Q.

With reference now to FIG. 6B, FIG. 6B illustrates another embodiment of an exemplified diagram of transferring basic data between or among groups, each of which is defined on various patterns of roads.

The exemplified diagram (611) shows that Vehicles a and c are traveling on a viaduct and Vehicle b is traveling on a road under the viaduct, and the viaduct and the road under the viaduct cross each other. Vehicle a belongs to two groups. Accordingly, Vehicle a can transfer the basic data from each of all of the other vehicles which belong to each of two groups to each of all of the other vehicles which belong to another group. Accordingly, for example, the basic data of Vehicle c can be transferred, via Vehicle a, to Vehicle b, even though Vehicle b is traveling on the road under the viaduct.

The exemplified diagram (612) shows that Vehicles d, e and f are traveling on a viaduct and Vehicle g is traveling on a road under the viaduct, and the viaduct and the road under the viaduct cross each other. Vehicle g belongs to two groups. Accordingly, Vehicle g can transfer the basic data from each of all of the other vehicles which belong to each of two groups to each of all of the other vehicles which belong to another group. Accordingly, for example, the basic data of Vehicle f can be transferred, via Vehicles e and g, to Vehicle d, even though Vehicle g is traveling on the road under the viaduct.

The exemplified diagram (613) shows that Vehicles h and i are traveling on a main road and Vehicles j, k and l is traveling on a side road which is close and parallel to the main road. Vehicle k belongs to two groups. Accordingly, Vehicle k can transfer the basic data from each of all of the other vehicles which belong to each of two groups to each of all of the other vehicles which belong to another group. Accordingly, for example, the basic data of Vehicle i can be transferred, via Vehicle k, to Vehicle l, even though Vehicle l is traveling on the side road.

FIGS. 7A to 7D illustrate an embodiment of exemplified diagrams of generating information on a line of vehicles, based on the nearby-vehicle information.

With reference now to FIG. 7A, FIG. 7A illustrates one embodiment of exemplified diagrams of generating information on a line of vehicles.

The exemplified diagram (701) shows that Vehicles A to O are now traveling on one lane and no oncoming vehicle is traveling on an opposite lane.

Let us suppose that Vehicle H (711) is now focused as a vehicle which generates information on a line of vehicles.

In one embodiment, the basic data of Vehicles A, B and C (721) can be transferred (712), via Vehicle D, to Vehicles E, F and G. Subsequently, the basic data of Vehicles A, B, C, D, E and F (722) can be transferred (713), via Vehicle G, to Vehicles H, I and J.

Similarly, the basic data of Vehicles M, N and O (724) can be transferred (715), via Vehicle L, to Vehicles J and K. Subsequently, the basic data of Vehicles M, N, O, K and L (723) can be transferred (714), via Vehicle J, to Vehicles G, H and I.

Accordingly, Vehicle H (711) can generate information on a line of vehicles, based on the nearby-vehicle information including in each of the basic data of Vehicles A, B, C, D, E and F (720) and further the basic data of Vehicles M, N, O, K and L (725) and still further the basic data of Vehicles G, H, I and J.

Alternatively, in another embodiment, Vehicle D generates information on a line of vehicles (hereinafter, in this embodiment, referred to as "first information on a line of vehicles"), based on the nearby-vehicle information including in each of the basic data of Vehicles A, B and C. The first information on the line of vehicles can be transferred, by Vehicle D, to Vehicles E, F and G. Subsequently, Vehicle G generates information on a line of vehicles (hereinafter, in this embodiment, referred to as "second information on a line of vehicles"), based on the first information on the line of vehicles and the nearby-vehicle information including in each of the basic data of D, E and F (and optionally, the nearby-vehicle information including in the basic data of G). Then, the second information on the line of vehicles can be transferred, by Vehicle G, to Vehicles H, I and J.

Similarly, Vehicle L generates information on a line of vehicles (hereinafter, in this embodiment, referred to as "third information on a line of vehicles"), based on the nearby-vehicle information including in each of the basic data of Vehicles M, N and O. The third information on the line of vehicles can be transferred, by Vehicle L, to Vehicles J and K. Subsequently, Vehicle J generates information on a line of vehicles (hereinafter, in this embodiment, referred to as "fourth information on a line of vehicles"), based on the third information on the line of vehicles and the nearby-vehicle information including in each of the basic data of L and K (and optionally, the nearby-vehicle information including in the basic data of L). Then, the fourth information on the line of vehicles can be transferred, by Vehicle J, to Vehicles G, H and I.

Vehicle H generates information on a line of vehicles (hereinafter, in this embodiment, referred to as "fifth information on a line of vehicles") (726), based on the second information on a line of vehicles and the basic data of H (and optionally G, if the second information on a line of vehicles was not generated based on the basic data of G). Similarly, Vehicle H generates information on a line of vehicles (hereinafter, in this embodiment, referred to as "sixth information on a line of vehicles") (727), based on the fourth information on a line of vehicles and the basic data of H and I (and optionally J, if the forth information on a line of vehicles was not generated based on the basic data of J). The combination of the fifth information on a line of vehicles (726) and the sixth information on a line of vehicles (727) can be used for generating display data.

Optionally, Vehicle H may further generate information on a line of vehicles (729), by combining the fifth information on a line of vehicles (726) with the sixth information on a line of vehicles (727) at the common point (728). This generated line of vehicles (729) can be used for generating display data, instead of the combination of the fifth information on a line of vehicles (726) and the sixth information on a line of vehicles (727).

Figure 7B:
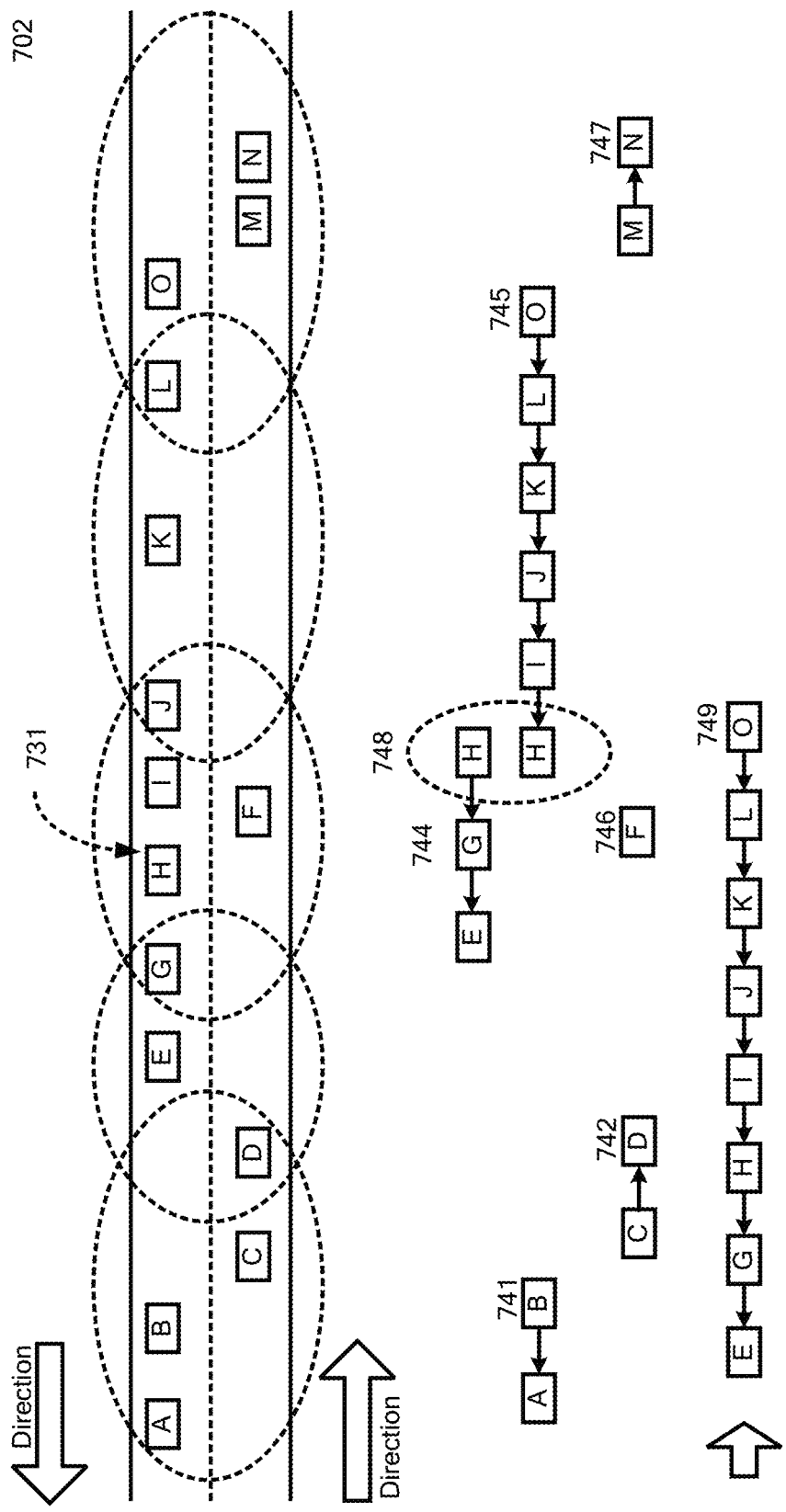

With reference now to FIG. 7B, FIG. 7B illustrates another embodiment of an exemplified diagram of generating information on a line of vehicles.

The exemplified diagram (702) shows that Vehicles A to O are now traveling on one lane or on the opposite lane.

Let us suppose that Vehicle H (731) is now focused as a vehicle which generates information on a line of vehicles.

The basic data of Vehicles A, B and C can be transferred, via Vehicle D, to Vehicles E and G. Please note that Vehicle D is traveling on the opposite lane of Vehicles A and B, but can transfer the basic data of Vehicles A and B. Subsequently, the basic data of Vehicles A, B, C, D and E can be transferred, via Vehicle G, to Vehicles H, I, J and F.

Similarly, the basic data of Vehicles M, N and O can be transferred, via Vehicle L, to Vehicles J and K. Subsequently, the basic data of Vehicles K, L, M, N and O can be transferred, via Vehicle J, to Vehicles G, H, I and F.

Vehicle H generates the following six sets of information on a line of vehicles: A and B (741, left direction); C and D (742, right direction); E, G and H (744, left direction); H, I, J, K, L and O (745, left direction); F (746, right direction); and M and N (747, right direction).

Vehicles C and D are traveling on the direction opposite of Vehicles A and B. Accordingly, the following two sets of information on a line of vehicles are generated: the set for Vehicles A and B, and the set for Vehicles C and D.

Vehicle B is traveling far from ahead of Vehicle E. Therefore, the basic data of E does not include nearby-vehicle information between Vehicles B and E. Accordingly, the set for Vehicles A and B (741) and the set for Vehicles E, G and H (744) cannot be combined with each other.

Vehicle F is traveling far from ahead of Vehicle D. Therefore, the basic data of D does not include nearby-vehicle information between Vehicles F and D. Accordingly, the set for Vehicles D and C (742) and the set for Vehicle F (746) cannot be combined with each other.

Vehicle F is traveling far from behind of Vehicle M and further ahead of Vehicle D. Therefore, the basic data of F does not include nearby-vehicle information between Vehicles M and F. Similarly, the basic data of D does not include nearby-vehicle information between Vehicles F and D. Accordingly, information on a line of vehicles for Vehicle F (746) is composed of Vehicle F only.

Vehicle M is traveling far from ahead of Vehicle F. Therefore, the basic data of F does not include nearby-vehicle information between Vehicles M and F. Accordingly, the set for Vehicles N and M (747) and the set for Vehicle F (746) cannot be combined with each other.

The combination of the set for Vehicles E, G and H (744) and the set for Vehicles H, I, J K, L and O (745) can be used for generating display data.

Optionally, Vehicle H (731) may further generate information on a line of vehicles (749), by combining the set for Vehicles E, G and H (744) and the set for Vehicles H, I, J K, L and O (745) at the point (748) common to the sets (744 and 745). This generated line of vehicles (749) can be used for generating display data, instead of the combination of the set for Vehicles E, G and H (744) and the set for Vehicles H, I, J K, L and O (745).

In this embodiment, the aforementioned six sets of information on a line of vehicles allow a management of all of Vehicles A to O.

In this embodiment, the following information on a line can be optionally used: (1) Lists of start point data, B, H, O, C, F and M; (2) Own vehicle line, True or False; (3) The number of elements, n, n being an positive integer; (4) N element data, each element data comprises (4-$a$) a pointer to basic data of the own vehicle, (4-$b$) a link pointer for a next element, this link pointer may be for basic data of a proceeding vehicle and, optionally, for basic data of a subsequent vehicle, and (4-$c$) a traveling direction vector of a preceding vehicle on an electronic map, which is referenced by the display unit when separated lines on the road are displayed in a connected manner.

Figure 7C:
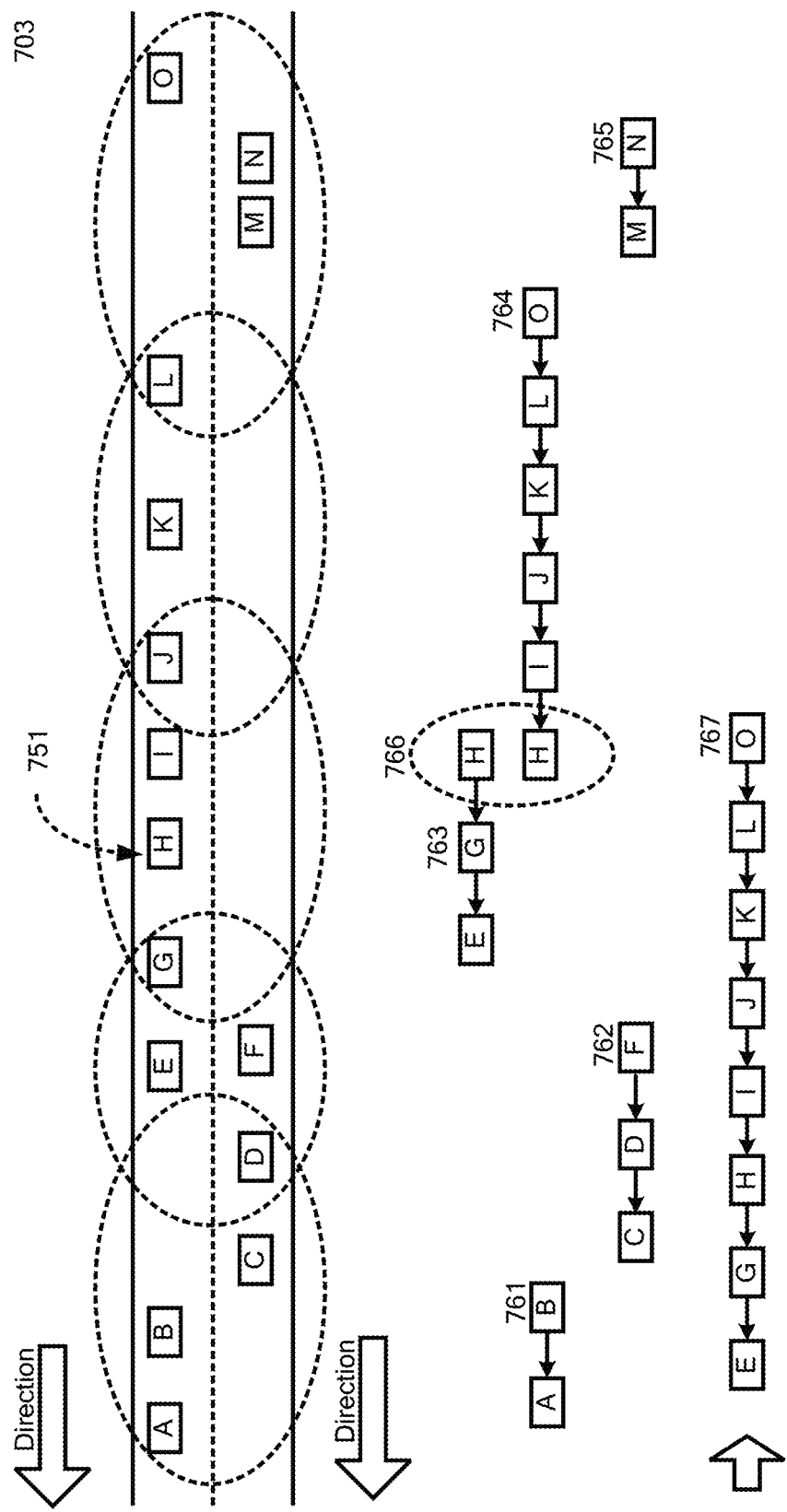

With reference now to FIG. 7C, FIG. 7C illustrates further another embodiment of an exemplified diagram of generating information on two parallel lines of vehicles.

The exemplified diagram (703) shows that Vehicles A to O are now traveling on each of two parallel lanes and no oncoming vehicle is traveling on the opposite lanes.

Let us suppose that Vehicle H (751) is now focused as a vehicle which generates information on a line of vehicles.

The basic data of Vehicles A, B and C can be transferred, via Vehicle D, to Vehicles E, F and G. Please note that Vehicle D is traveling on the parallel lane of Vehicles A and B, but can transfer the basic data of Vehicles A and B. Subsequently, the basic data of Vehicles A, B, C, D, E and F can be transferred, via Vehicle G, to Vehicles H, I and J.

Similarly, the basic data of Vehicles M, N and O (721) can be transferred, via Vehicle L, to Vehicles J and K. Subsequently, the basic data of Vehicles K, L, M, N and O can be transferred, via Vehicle J, to Vehicles G, H and I.

Vehicle H generates the following five sets of information on a line of vehicles: A and B (761, left direction); C, D and F (762, left direction); E, G and H (763, left direction); H, I, J, K, L and O (764, left direction); and M and N (765, left direction).

Vehicles C, D and F are traveling on the same direction of Vehicles A and B, but the lanes of Vehicles A and B and the lanes of Vehicles C, D and F are different with each other. Accordingly, the following two sets of information on a line of vehicles are generated: the set for Vehicles A and B (761), and the set for Vehicles C, D and F (762).

Vehicle B is traveling far from ahead of Vehicle E. Therefore, the basic data of E does not include nearby-vehicle information between Vehicles B and E. Accordingly, the set for Vehicles A and B (761) and the set for Vehicles E, G and H (763) cannot be combined with each other.

Vehicle F is traveling far from ahead of Vehicle M. Therefore, the basic data of M does not include nearby-vehicle information between Vehicles F and M. Accordingly, the set for Vehicle C, D and F (762) and the set for Vehicles M and N (765) cannot be combined with each other.

The combination of the set for Vehicles E, G and H (763) and the set for Vehicles H, I, J, K, L and O (764) can be used for generating display data.

Optionally, Vehicle H (751) may further generate information on a line of vehicles (767), by combining the set for Vehicles E, G and H (763) and the set for Vehicles H, I, J K, L and O (764) at the point (766) common to the sets (763 and 764). This generated line of vehicles (767) can be used for generating display data, instead of the combination of the set for Vehicles E, G and H (744) and the set for Vehicles H, I, J K, L and O (745).

In this embodiment, the aforementioned five sets of information on a line of vehicles allow a management of all of Vehicles A to O.

With reference now to FIG. 7D, FIG. 7D illustrates still further another embodiment of an exemplified diagram of generating information on lines of vehicles at the intersection.

The exemplified diagram (704) shows that Vehicles A to O are now traveling adjacent or close to the intersection.

Let us suppose that Vehicle F (771) is now focused as a vehicle which generates information on a line of vehicles.

The basic data of Vehicles A, B and C can be transferred, via Vehicle D, to Vehicles E, F and G. Subsequently, the basic data of Vehicles A, B and C can be transferred, via Vehicle D, to Vehicles E, F and G.

The basic data of Vehicles D, E and G can be directly transferred to Vehicle F (771).

The basic data of Vehicles H, K, J and I can be transferred, via Vehicle D, to Vehicles E, F and G. Similarly, the basic data of Vehicles L, M N and O can be transferred, via Vehicle D, to Vehicles E, F and G.

Vehicle F (771) generates the following seven sets of information on a line of vehicles: A, B and C (781, left direction); D, E and F (782, left direction); F and G (783, left direction); O and N (784, down direction); I and J (785, down direction); H and K (786, upward direction); and L and M (787, upward direction).

Vehicles A, B, C, D, E, F and G are traveling on the same direction or left direction, but Vehicle D is now on the intersection. Accordingly, Vehicle F (771) separately generates the set for Vehicles A, B and C (781) and the set for Vehicles F and G (783), according to the information on a road position on the electronic map.

Similarly, Vehicle F (771) separately generates the set for Vehicles O and N (784) and the set for Vehicles I and J (785). Further, Vehicle F (771) separately generates the set for Vehicles H and K (786) and the set for Vehicles L and M (787).

Further, Vehicle F (771) generates the set for Vehicles F and G (783), based on the basic data of Vehicle G.

The combination of the set for Vehicles D, E and F (782) and the set for Vehicles F and G (783) can be used for generating display data.

Optionally, Vehicle F (771) may further generate information on a line of vehicles (789), by combining the set for Vehicles D, E and F (782) and the set for Vehicles F and G (783) at the point (788) common to the sets (782 and 783). This generated line of vehicles (789) can be used for generating display data, instead of the combination of the set for Vehicles D, E and F (782) and the set for Vehicles F and G (783).

In this embodiment, the aforementioned seven sets of information on a line of vehicles allow a management of all of Vehicles A to O.

According to this embodiment, when a vehicle is traveling on a bifurcation point such as a bifurcated road, a side road and an intersection; or on a hi-level road or under a girder bride, information on a line of vehicles are separately generate at the bifurcation point.

Figure 8A:
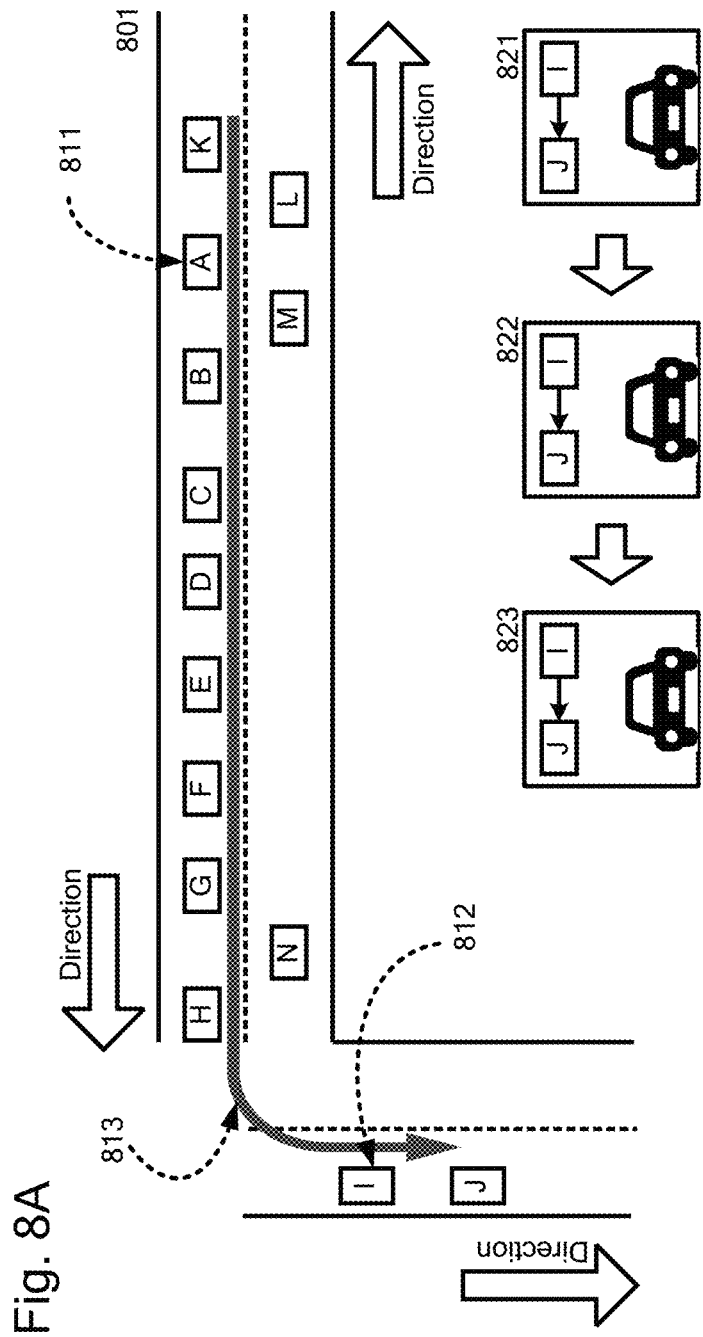
FIGS. 8A and 8B illustrate an embodiment of exemplified diagrams of successively transferring image data taken by an on-vehicle camera of a specified vehicle, in response to a user instruction of selecting the specific vehicle.
Figure 8B:
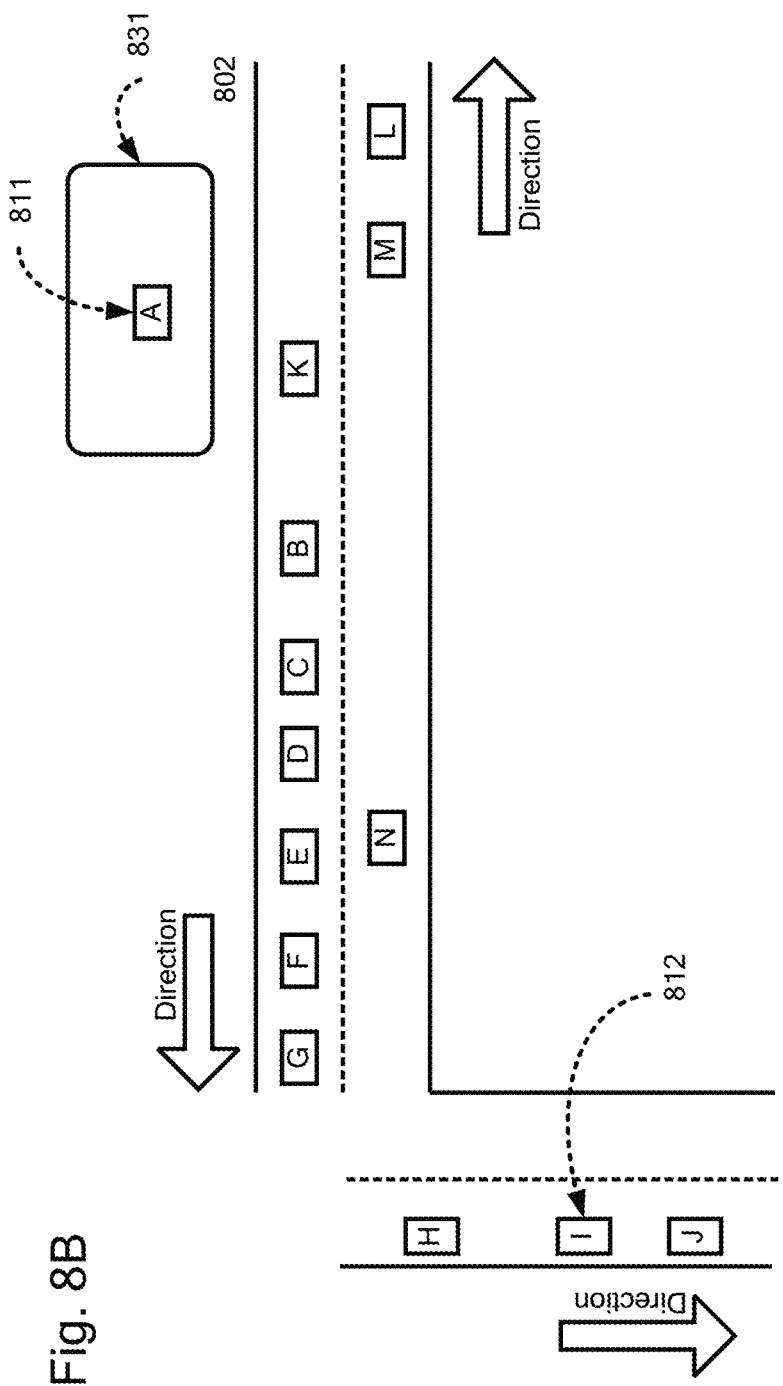

FIGS. 8A and 8B illustrate an embodiment of exemplified diagrams of successively transferring image data taken by an on-vehicle camera of a specified vehicle, in response to a user instruction of selecting the specific vehicle.

With reference now to FIG. 8A, FIG. 8A illustrates one embodiment of start of a process for transfer image data taken by an on-vehicle camera of the specified vehicle.

The exemplified diagram (801) shows that Vehicles A to N are now traveling adjacent or close to the intersection.

Let us suppose that Vehicle A (811) is now focused as a vehicle in which a user selects a specific vehicle, i.e. Vehicle I (812), to see image which is derived from image data successively taken by an on-vehicle camera of this Vehicle I (812).

In response to the user selection of a specific vehicle, Vehicle A (811) generates a command indicating that Vehicle I (812) is specified. This command is used for requesting one or more vehicle which will transfer image data taken by an on-vehicle camera of a specified vehicle, i.e. Vehicle I (812). This command may comprise the following; (A) an identifier which is associates with a request for transferring image data; (B) a specification of a request for transferring image data taken by an on-vehicle camera of a specified vehicle, i.e. Vehicle I (812), or a request for transferring image data taken by an on-vehicle camera of a vehicle or each of vehicles which is traveling immediately ahead of or behind the specified vehicle, i.e. Vehicle A (811); and (C) an identifier of a specified vehicle, i.e. Vehicle A (812).

In response to the generation of the aforementioned command, Vehicle A (811) broadcasts it together with the basic data via the communication unit (122). This command can be transferred to a group or groups to which Vehicle A (811) belongs and, further, to another or other groups via a vehicle or each of vehicles which belongs to the two or more groups. As a result, this command can be transferred (813) from Vehicle A (811) to Vehicle I (812).

If Vehicle I (812) receives the aforementioned command, Vehicle I (812) starts to generate communication information including another command indicating "in a progress of transferring image data".

As long as Vehicle I (812) receives the aforementioned command, Vehicle I (812) also generates communication information including the aforementioned another command indicating "in a progress of transferring image data".

If one or more vehicles between or among Vehicle A (811) to Vehicle I (812), i. e. Vehicles B to H, and which belong to two groups receives the basic data together with the communication information including the aforementioned another command indicating "in a progress of transferring image data this one or more vehicles transfer image data originated from Vehicle I (812) to all of other vehicles which belong to another or other groups. This one or more vehicles between or among Vehicle A (811) to Vehicle I (812) remember the following: the command was issue for Vehicle I (812); and information on the specified vehicle. This transfer may be done without changing a frequency of the transfer of the image data or thinning-out the number of the image data. In other words, this transfer may be done by controlling one or more vehicles which transfer image data originated from the specified vehicle so as to stop lowering the frequency of the transfer, or to restore the original frequency of the transfer, or to make the present frequency of the transfer closer to the original frequency of the transfer. Any vehicle in charge of a hop between or among groups can transfer the command to a group which exists in a direction to which the data is transmitted.

As seen in the display data (821, 822 and 823), Vehicle A (811) can successively display, on a display device of Vehicle A (811), these display data (821, 822 and 823), each of which comprises image data originated from Vehicle I (812).

Accordingly, a people in Vehicle A (811) can see in real time image originated from Vehicle I (812).

With reference now to FIG. 8B, FIG. 8B illustrates one embodiment of stop of the process mentioned in FIG. 8A.

The exemplified diagram (802) shows that Vehicles B to O are now traveling adjacent or close to the intersection, but Vehicle A is now in the parking area (831).

For example, the stop of the process mentioned in FIG. 8A may occur in a case where Vehicle A (811) stops, for example at the parking area (831).

Alternatively, for example, the stop of this process may occur in the following situations: in a case where the specification of Vehicle I (812) is terminated by the user in Vehicle A (811); or in a case where the aforementioned command cannot be reached to Vehicle I (812), because Vehicle A (811) is traveling so as to leave Vehicle I (812).

In these situations, Vehicle I (812) generates basic data which does not include the aforementioned another command indicating "in a progress of transferring image data".

If one or more vehicles between or among Vehicle A (811) to Vehicle I (812) and which belong to two groups does not receive the aforementioned another command, this one or more vehicles transfer image data originated from Vehicle I (812) to all of other vehicles which belong to another or other groups with thinning-out the number of the image data or changing a frequency of the transfer of the image data. In other words, this transfer may be done by controlling one or more vehicles which transfer image data originated from the specified vehicle so as to thin-out the number of image data or to make a frequency of the transfer lower, compared to the present frequency of the transfer. This control may be done depending on the number of hops.

According to this embodiment, there is no need in Vehicle I (812) to manage a source of a vehicle which first transmits the aforementioned command, but there is need in Vehicle I (812) to manage that the aforementioned command is transmitted from somewhere.

Figure 9A:
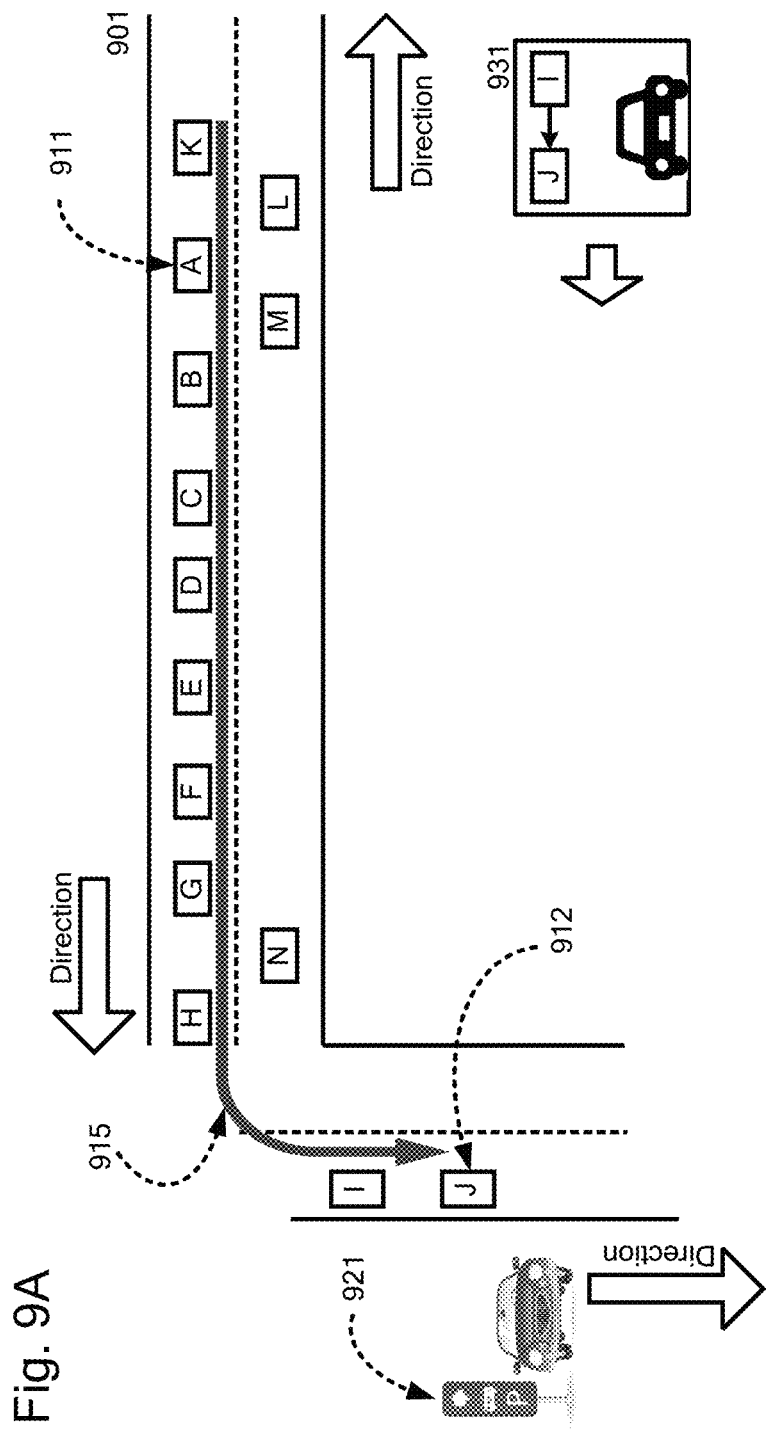
FIGS. 9A and 9B illustrate an embodiment of exemplified diagrams of successively transferring image data taken by an on-vehicle camera of each of vehicles which is traveling in the vicinity of the specified location or specified subject, in response to a user selection of a specific location or specific subject, respectively.
Figure 9B:
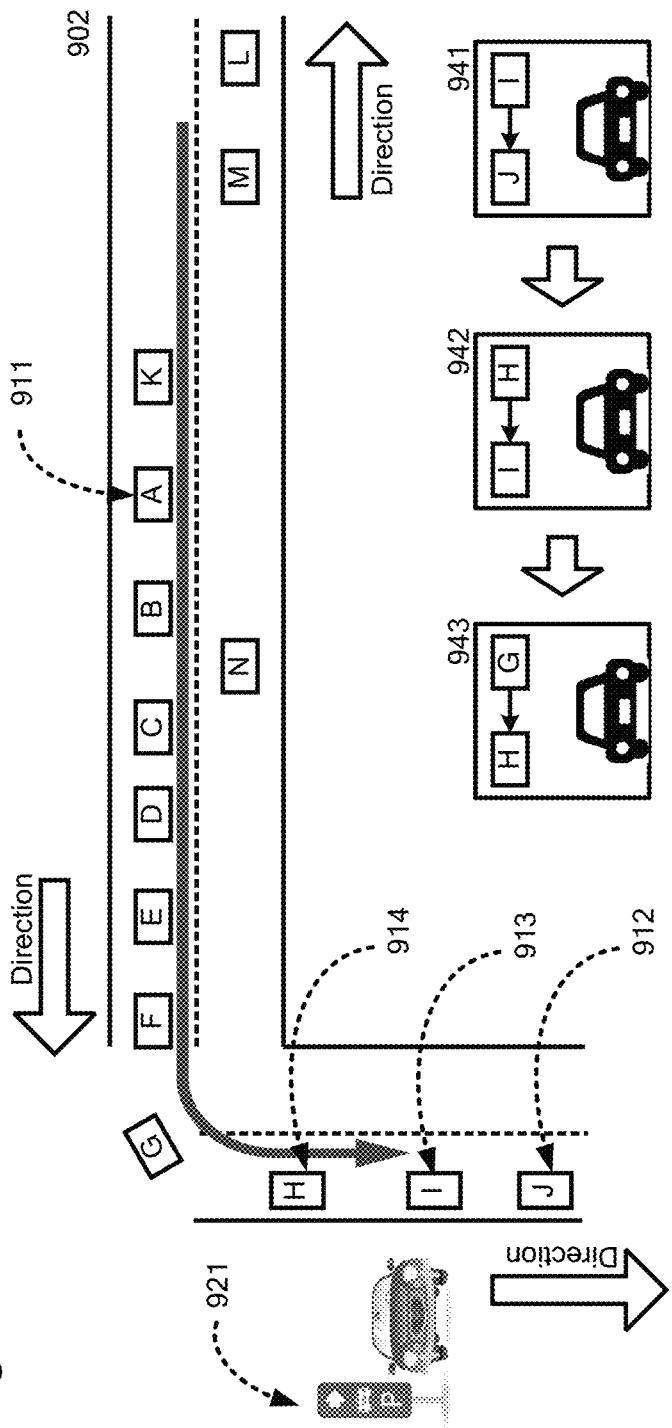

FIGS. 9A and 9B illustrate an embodiment of exemplified diagrams of successively transferring image data taken by an on-vehicle camera of each of vehicles which is traveling in the vicinity of the specified location or specified subject, in response to a user selection of a specific location or specific subject, respectively.

A specific location may be, for example, but not limited to, a parking area, a park, a bifurcation point such as a bifurcated road, a side road and an intersection, or an entrance of these.

A specific subject may be, for example, but not limited to, a building, a station, a highway, or a vehicle.

Hereinafter, a case of a specific location will be explained. However, this explanation can be applied also to a case of a specific subject.

With reference now to FIG. 9A, FIG. 9A illustrates one embodiment of start of a process for transfer image data taken by an on-vehicle camera of each of vehicles which is traveling in the vicinity of the specified location, in response to a user selection of a specific location.

The exemplified diagram (901) shows that Vehicles A to N are now traveling adjacent or close to the intersection.

Let us suppose that Vehicle A (911) is now focused as a vehicle in which a user selects a specific location, or a parking area (921), to see image which is derived from image data successively taken by an on-vehicle camera of one or more vehicles which are traveling.

In response to the user selection of a specific location or the parking area (921), Vehicle A (911) generates a command indicating that the parking area (921) is specified. This command is used for requesting one or more vehicle which will transfer image data taken by an on-vehicle camera of each of this one or more vehicles which are now traveling adjacent or close to the parking area (921). This command may comprise the following; (A) an identifier which is associates with a request for transferring image data originated from the specific location or specific subject; (B) a specified location or specified subject; (C) an error range of the specified location or specified subject; (D) a specification of a direction of an on-vehicle camera, and (E) an identifier of a specific vehicle which may vary based on the fact that which vehicle takes the specified location or specified subject.

In response to the generation of the aforementioned command, Vehicle A (911) broadcasts it together with the basic data via the communication unit (122). This command can be transferred to a group or groups to which Vehicle A (911) belongs and, further, to another or other groups via a vehicle or each of vehicles which belongs to the two or more groups. As a result, this command can be transferred (915) from Vehicle A (911) to one or more vehicles which are now traveling adjacent or close to the parking area (921).

If Vehicle J (912) is now traveling adjacent or close to the parking area (921) and receives the aforementioned command, Vehicle J (912) starts to generate communication information including another command indicating "in a progress of transferring image data of the specified location or specified subject".

As long as Vehicle J (912) is traveling adjacent or close to the parking area (921) and receives the aforementioned command, Vehicle J (912) also generates communication information including the aforementioned another command indicating "in a progress of transferring image data of the specified location or specified subject".

If one or more vehicles between or among Vehicle A (911) to Vehicle J (912) and which belong to two groups receives the basic data together with the communication information including the aforementioned another command indicating "in a progress of transferring image data of the specified location or specified subject", this one or more vehicles transfer image data originated from Vehicle J (912) to all of other vehicles which belong to another or other groups. This one or more vehicles between or among Vehicle A (911) to Vehicle J (912) remember the following: the command was issue for a specific vehicle or vehicles which took or take the image data of the specified location or specified subject; and information on the specified location or specified subject. This transfer may be done without changing a frequency of the transfer of the image data or thinning-out the number of the image data. In other words, this transfer may be done by controlling one or more vehicles which transfer image data originated from the one or more vehicles which are now traveling adjacent or close to the specified location or specified subject so as to stop lowering the frequency of the transfer, or to restore the original frequency of the transfer, or to make the present frequency of the transfer closer to the original frequency of the transfer. Any vehicle in charge of a hop between or among groups can transfer the command to a group which exists in a direction to which the data is transmitted.

As seen in the display data (931), Vehicle A (911) can display, on a display device of Vehicle A (911), the display data (931) which comprises image data originated from Vehicle J (912) which is now traveling adjacent or close to the parking area (921).

Accordingly, a people in Vehicle A (911) can see in real time image originated from Vehicle J (912) which is now traveling adjacent or close to the parking area (921).

With reference now to FIG. 9B, FIG. 9B illustrates one embodiment of successively transferring image data originated from one or more vehicles which are now traveling adjacent or close to the parking area (921).

The exemplified diagram (902) shows that Vehicle I (913) and Vehicle H (914) are subsequently traveling adjacent or close to the intersection after Vehicle J (911).

If Vehicle I (913) is now traveling adjacent or close to the parking area (921) and receives the aforementioned command, Vehicle I (913) starts to generate communication information including the aforementioned another command indicating "in a progress of transferring image data of the specified location or specified subject".

As long as Vehicle I (913) is traveling adjacent or close to the parking area (921) and receives the aforementioned command, Vehicle I (913) also generates communication information including the aforementioned another command indicating "in a progress of transferring image data of the specified location or specified subject".

Similarly, if Vehicle H (914) is now traveling adjacent or close to the parking area (921) and receives the aforementioned command, Vehicle H (914) starts to generate communication information including the aforementioned another command which indicates "in a progress of transferring image data of the specified location or specified subject".

As long as Vehicle H (914) is traveling adjacent or close to the parking area (921) and receives the aforementioned command, Vehicle H (914) also generates communication information including the aforementioned another command indicating "in a progress of transferring image data of the specified location or specified subject".

As seen in the display data (942 and 943), Vehicle A (811) can successively display, on a display device of Vehicle A (811), these display data (942 and 943), each of which comprises image data originated from Vehicle I (812) and Vehicle H (914), respectively.

For the transfer of image data, if Vehicle J (912) passes away the parking area (921), Vehicle J (912) generates basic data which does not include the aforementioned another command indicating "in a progress of transferring image data of the specified location or specified subject".

Similarly, if Vehicle I (913) passes away the he parking area (921), Vehicle I (913) generates basic data which does not include the aforementioned another command indicating "in a progress of transferring image data of the specified location or specified subject".

For the transfer of image data, the same applies also to Vehicle (914) or subsequent vehicle or vehicles.

If one or more vehicles between or among Vehicle A (911) to Vehicle J (912) and which belong to two groups receives the basic data but do not receive the aforementioned another command indicating "in a progress of transferring image data of the specified location or specified subject", this one or more vehicles transfer image data originated from Vehicle J (912) to all of other vehicles which belong to another or other groups with thinning-out the number of the image data or changing a frequency of the transfer of the image data. In other words, this transfer may be done by controlling one or more vehicles which transfer image data originated from the specified vehicle so as to thin-out the number of image data or to make a frequency of the transfer lower, compared to the present frequency of the transfer. This control may be done depending on the number of hops.

The stop of the process mentioned in FIG. 8A may occur, for example, in a case where the specification of the location or subject is terminated by the user in Vehicle A (911).

Alternatively, for example, the stop of this process may occur in the following situations: in a case where the aforementioned command cannot be reached to a vehicle which is now traveling adjacent or close to the specified location or specified subject, because Vehicle A (911) is traveling so as to leave this vehicle which is now traveling adjacent or close to the specified location or specified subject.

Figure 10:
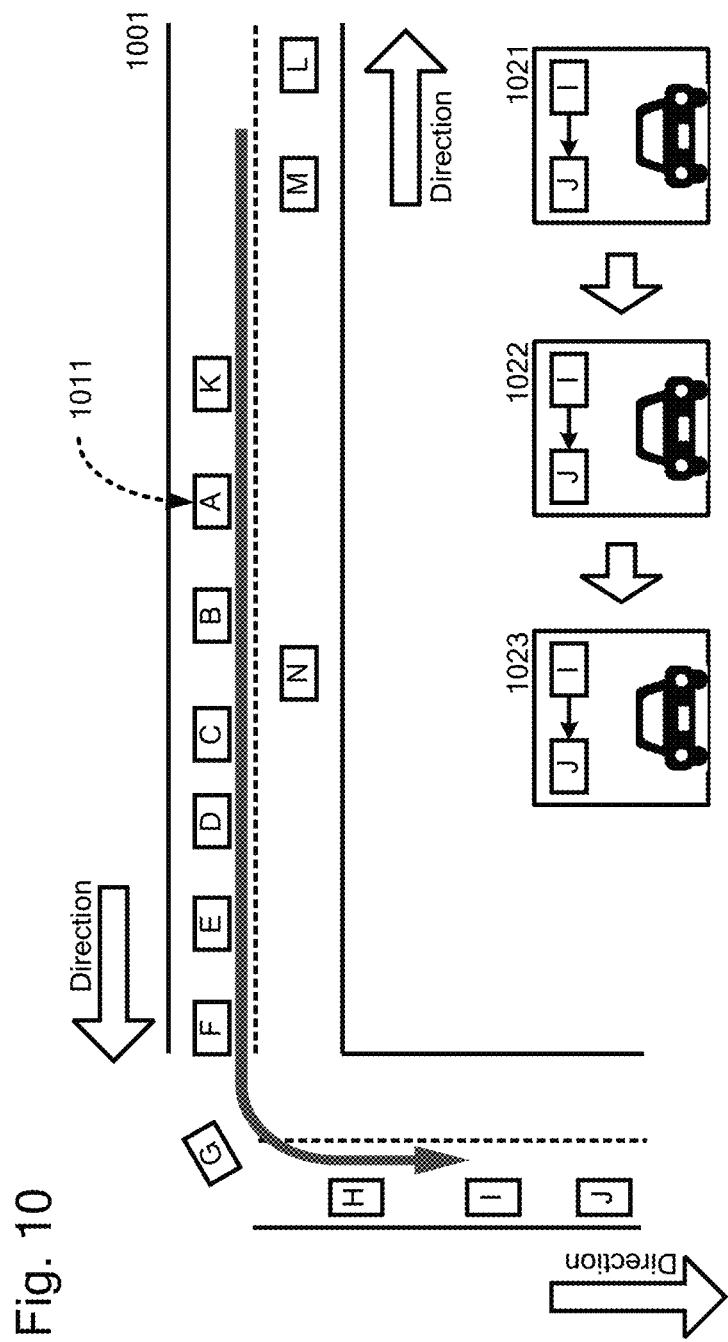
FIG. 10 illustrates an embodiment of an exemplified diagram of presenting an embodiment of an exemplified diagram of presenting image data which is notified and transferred as a recommended notification of image data.

With reference now to FIG. 10, FIG. 10 illustrates an embodiment of an exemplified diagram of presenting image data which is notified and transferred as a recommended notification of image data.

The exemplified diagram (1001) shows that Vehicles A to N are now traveling adjacent or close to the intersection.

Let us suppose that Vehicle A (1011) is now focused as a vehicle which provides image data as a recommended notification of image data to another or other vehicles.

This recommended notification can be achieved, for example, by using the embodiment described in FIGS. 8A and 8B, the embodiment described in FIGS. 9A and 9B, or a combination of these.

Let us suppose that Vehicle A (1011) is now focused as a vehicle in which a user selects recommendation of image data to broadcast it to one or more vehicles. The image data may be as follows: image data taken by an on-vehicle camera of a specified vehicle (see FIGS. 8A and 8B), image data taken by an on-vehicle camera of each of vehicles which is traveling in the vicinity of the specified location or specified subject (see FIGS. 9A and 9B), or combination of these.

In response to the user selection of a specific vehicle, specific location or specific subject, Vehicle A (1011) generates a command indicating a recommended notification according to the selected vehicle, location or subject, as described in the descriptions of FIGS. 8A and 8B or FIGS. 9A and 9B. This command may comprise the following: (A) an identifier which is associates with a request for a recommended notification; (B) the items in the aforementioned command which is the same as that described in the descriptions of FIGS. 8A and 8B or FIGS. 9A and 9B; (C); one or more vehicles ID to which the recommended notification is transferred; and, optionally, (D) a name of the recommender and (E) a message from the recommender.

In response to the generation of the aforementioned command Vehicle A (911) broadcasts it together with the basic data via the communication unit (122). This command can be transferred to a group or groups to which Vehicle A (911) belongs and, further, to another or other groups via a vehicle or each of vehicles which belongs to the two or more groups. As a result, this command can be transferred (915) from Vehicle A (911) to one or more vehicles which are specified in the transferred command.

If a vehicle receives the aforementioned command, the vehicle performs the steps described in FIGS. 8A and 8B or FIGS. 9A and 9B.

Figure 11A:
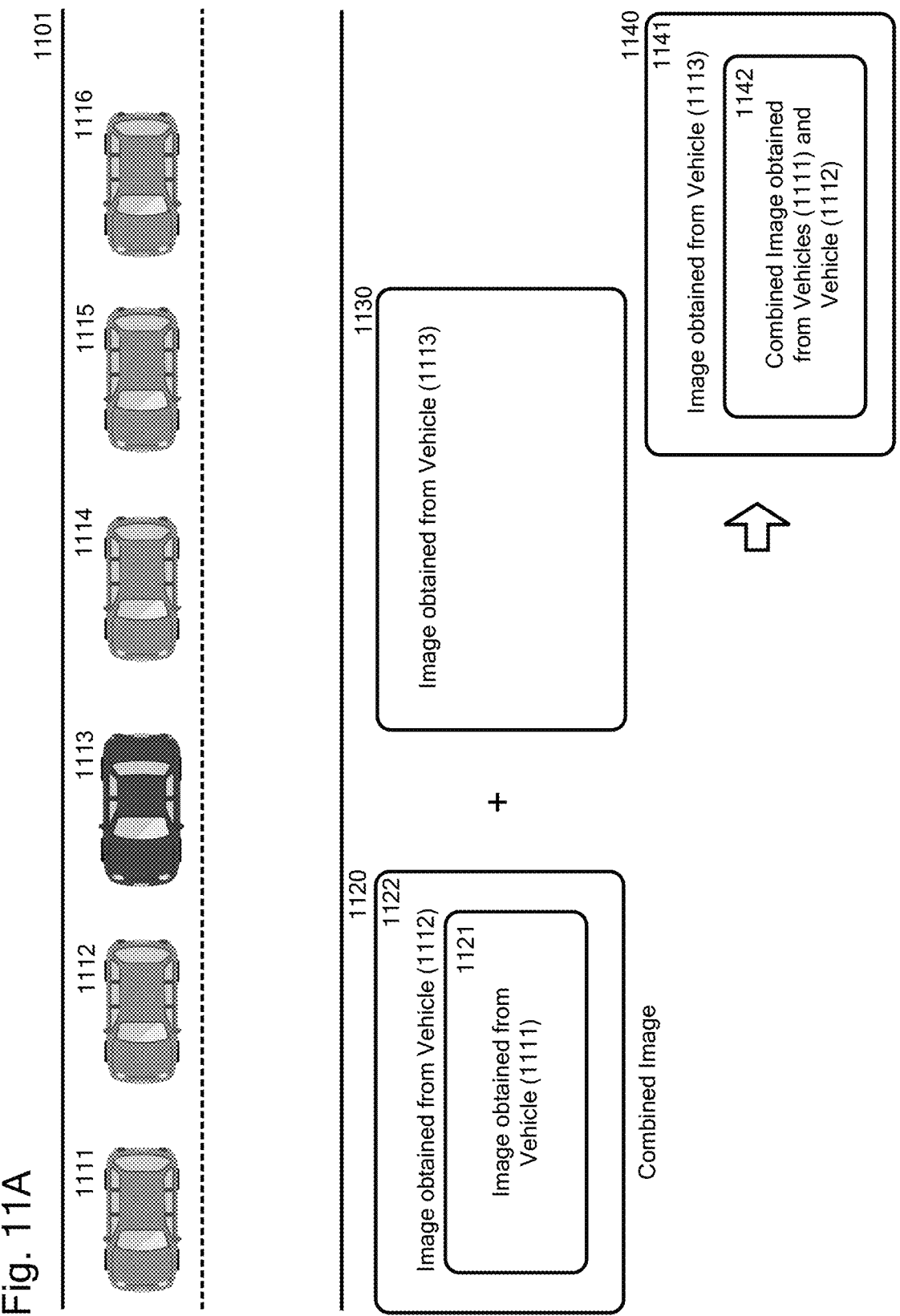

FIGS. 11A and 11B illustrate an embodiment of exemplified diagrams of presenting in real-time display data comprising image data which is being successively sent from the specified vehicle or from each of vehicles which is traveling in the vicinity of the specified location or specified subject.

With reference now to FIG. 11A, FIG. 11A illustrates an embodiment of an exemplified diagram of presenting display data in real-time.

The exemplified diagram (1101) is the same as that (151) described in FIG. 1B.

Let us suppose that Vehicle (1113) can present the display data (1140) on a display device of Vehicle (1113) itself.

Vehicle (1113) receives the combined image data (1120) which was already generated by combining the image (1121) obtained from Vehicle (1111) with the image (1122) obtained from Vehicle (1112), and further receives the image data (1130) obtained from Vehicle (1113) itself. Then, the image (1130) is combined with the combined image (1120) to generate the display data (1140). In this embodiment, the combined image (1120, corresponding to 1142) is embedded in or overlaid on the image (1130, corresponding to 1141).

With reference now to FIG. 11B, FIG. 11B illustrates another embodiment of an exemplified diagram of presenting display data in real-time.

The exemplified diagram (1102) is the same as that (151) described in FIG. 1B.

Let us suppose that Vehicle (1143) can present the display data (1150) on a display device of Vehicle (1143) itself.

The display data (1150) shows that plural image data or three image data (1141, 1142 and 1143) are superimposed according to information on a line of vehicles, for example according to an order of the line of vehicles (1141, 1142 and 1143 from the top of the line of vehicles).

Figure 12A:
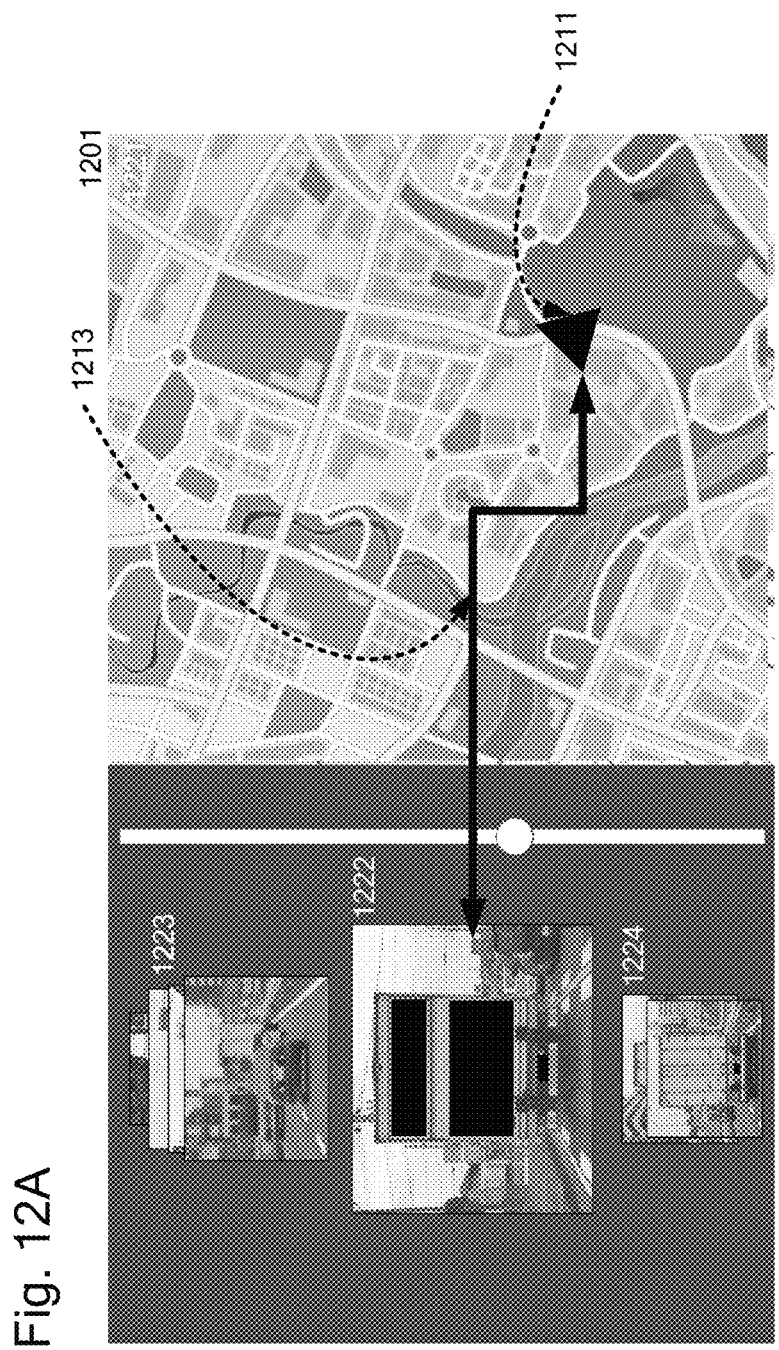

FIGS. 12A and 12B illustrate an embodiment of exemplified diagrams of displaying image data together with an electronic map.

With reference now to FIG. 12A, FIG. 12A illustrates one embodiment of an exemplified diagram of displaying image data together with an electronic map.

The display device (1201) of a vehicle shows the plural images (1222, 1223 and 1224) together with the electronic map (1221) on which the icon (1211) are illustrated. Each of the plural images (1222, 1223 and 1224) was transferred from each of the vehicles which are running on the same lane on the road. The display device (1201) further shows the association arrow (1213) which indicates an association of the icon (1211) with the image (1222). This association means that the image (1222) is taken by the vehicle represented by the icon (1211).

With reference now to FIG. 12B, FIG. 12B illustrates another embodiment of an exemplified diagram of displaying image data together with an electronic map.

The display device (1202) of a vehicle shows the display after the user selection of the image (1223).

In response to the user selection of the image (1223) on the display device, the display device (1202) shows the plural images (1242, 1243 and 1245) together with the electronic map (1241) on which the icons (1231 and 1232) are illustrated. The image (1243) corresponds to the image (1223) selected by the user, and is associated with the icon (1232).

The display device (1202) further shows the association arrow (1233) which indicates an association of the icon (1232) with the image (1243). This association means that the image (1243) is taken by the vehicle represented by the icon (1232).

Accordingly, the user can select the image data among plural image data displayed on the display device (1202).

Figure 13:
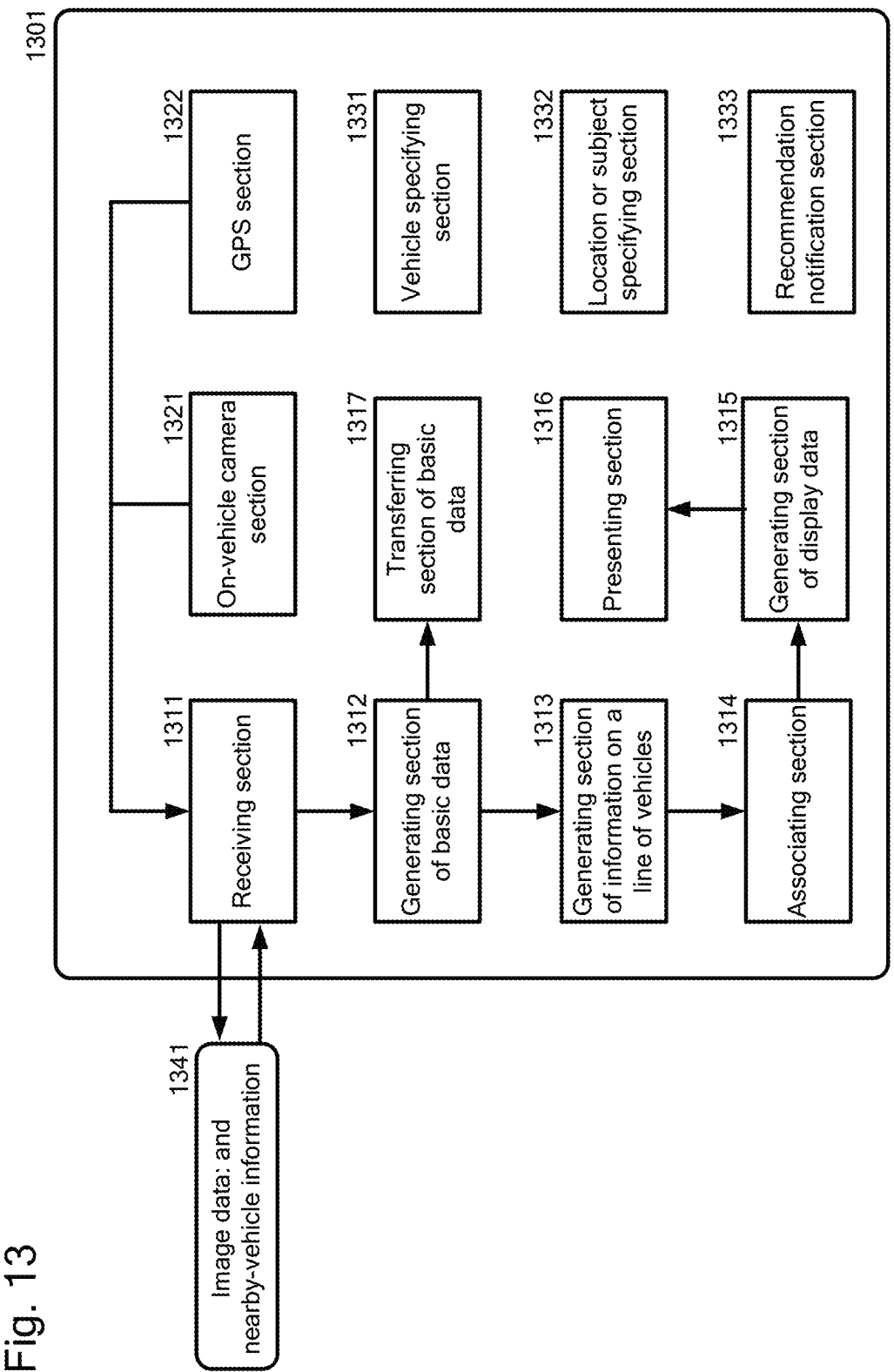
FIG. 13 illustrates an embodiment of an overall functional block diagram of a system hardware used in accordance with an embodiment of the flowcharts described in FIG. 3.

FIG. 13 illustrates an embodiment of an overall functional block diagram of a system hardware used in accordance with an embodiment of the flowcharts described in FIG. 3.

The system (1301) can be equipped with the vehicle (101) described in FIG. 1.

The system (1301) comprises a receiving section (1311), a generating section of basic data (1312), a generating section of information on a line of vehicles (1313) and an associating section (1314) as well as an on-vehicle camera section (1321) and a GPS section (1321).

The system (1301) may further comprise a generating section of display data (1315), a presenting section (1316), a transferring section of basic data (1317).

The system (1301) may still further one or more of the following sections: a vehicle specifying section (1331), a location or subject specifying section (1332) and a recommendation notification section (1333).

The receiving section (1311) receives the image data and information on a vehicle which locates in the vicinity of a vehicle ("nearby-vehicle information") (1341). Alternatively, the receiving section (1311) may receive, from a plurality of vehicles capable of making a communication with each other via a communication network, image data taken by the on-vehicle camera of each of the vehicles ("image data") and nearby-vehicle information on a vehicle which is immediately ahead of this each vehicle ("nearby-vehicle information"). The image data and nearby-vehicle information may be successively transferred from each of a plurality of vehicles capable of making a communication with each other. The number of the image data to be received may be thinned-out or a frequency of the transfer of the image data to be received may be changed, depending on the number of hops. The image data may be one taken by an on-vehicle camera of a vehicle which is immediately ahead of or behind a vehicle in which the display data is presented.

The receiving section (1311) may perform step 302 described in FIG. 3A.

The generating section of basic data (1312) generates basic data, based on the image data and the information on position.

The generating section of basic data (1312) may perform the former part in step 303 described in FIG. 3A.

The generating section of information on a line of vehicles (1313) generates information on a line of vehicles, based on the nearby-vehicle information. The line of vehicles may be composed of a plurality of groups. Each of the groups may haves at least one vehicle commonly belonging to two or more groups among the plurality of groups. The generating section of information on a line of vehicles (1313) may further update the information on the line of vehicles, based on the transferred nearby-vehicle information.

The generating section of information on a line of vehicles (1313) may perform step 304 described in FIG. 3A.

The associating section (1314) associates the image data with the information on a line of vehicles. The associating section (1314) may further associate the transferred image data with the updated information on the line of vehicles.

The associating section (1314) may perform step 305 described in FIG. 3A.

The on-vehicle camera section (1321) takes image, i.e. visual information, in a predefined area surrounding the vehicle (101). The on-vehicle camera section (1321) may correspond to the on-vehicle camera (121) described in FIG. 1A.

The GPS section (1321) obtains information on position or geolocation of the vehicle (101) itself and time information. The GPS section (1321) may correspond to the GPS unit (123) described in FIG. 1A.

The generating section of display data (1315) generates display data, using one or more image data. The display data may comprise the image data originated from another or other vehicles. The display data may comprise image data obtained from an on-vehicle camera of a vehicle which is immediately ahead of or behind a vehicle in which the display data is presented. The display data may be generated by combining plural image data. Alternatively, the display data may be generated by combining one or more image data with an electronic map. The display data may be, for example, one in which plural image data are superimposed according to the information on a line of vehicles, one in which plural image data are arranged according to the information on a line of vehicles, or one in which plural image data are displayed on an electronic map, according to the information on a line of vehicles.

The generating section of display data (1315) may perform step 306 described in FIG. 3A.

The presenting section (1316) presents the display data on a display device in the vehicle. The presenting section (1316) may present, in real-time on a display device of a vehicle, display data comprising image data which is being successively sent from the specified vehicle. The presenting section (1316) may present the display data on a display device of a vehicle. The presenting section (1316) may present the display data on an area with flat or substantially flat and no shade on a front glass of a vehicle.

The presenting section (1316) may perform step 307 described in FIG. 3A.

The transferring section of basic data (1317) transfers the basic data to another or other vehicles via the communication unit (122).

The transferring section of basic data (1317) may perform the latter part in step 303 described in FIG. 3A.

The vehicle specifying section (1331) generates a command indicating that a specified vehicle is specified in response to a user selection of a specified vehicle, and then sends this command together with the basic data to another or other vehicles.

The vehicle specifying section (1331) may perform steps 308 and 309 as well as steps 312 and 313 described in FIG. 3B.

The location or subject specifying section (1332) generates a command indicating that a specific location or specific subject is specified, in response to a user selection of a specific location or specific subject, and then sends this command together with the basic data to another or other vehicles.

The location or subject specifying section (1332) may perform steps 310 and 311 described in FIG. 3B.

The recommendation notification section (1333) generates a command according to the selected vehicle, location or subject, as described in the descriptions of FIGS. 8A and 8B or FIGS. 9A and 9B, and then sends this command together with the basic data to another or other vehicles.

According to the aforementioned descriptions, an embodiment of the present invention can be expressed as claims initially filed. Further, according to the aforementioned descriptions, another embodiment of the present invention can be expressed as follows, but not limited thereto.

A computer-implemented method for transferring image data taken by an on-vehicle camera, the method comprising: receiving, from a plurality of vehicles capable of making a communication with each other via a communication network, image data taken by the on-vehicle camera of each of the vehicles (image data) and nearby-vehicle information on a vehicle which is immediately ahead of this each vehicle (nearby-vehicle information); generating information on a line of vehicles, based on the nearby-vehicle information, and then associating the image data with the information on a line of vehicles; and generating display data, using the image data.

The method may further comprises that the plurality of vehicles is defined as a first group, and a second group is formed similarly, and if a first vehicle which belongs to the first group belongs also to the second group, the first vehicle receives, from all of the other vehicles which belong to the second group, image data taken by the on-vehicle camera of each of the other vehicles and nearby-vehicle information on a vehicle which is immediately ahead of this each of the other vehicle, and then transfers, to other vehicles which belong to the first group, this received image data and nearby-vehicle information.

The method may further comprises that a third group is formed similarly, and if a second vehicle which belongs to the second group belongs also to the third group, the second vehicle receives, from all of the other vehicles which belong to the third group, image data taken by the on-vehicle camera of each of the other vehicles and nearby-vehicle information on a vehicle which is immediately ahead of this each of the other vehicle, and then transfers, to other vehicles which belong to the second group, this received image data and nearby-vehicle information.

The method may further comprises that the vehicle which belongs to both of the first and second groups transfers, to other vehicles which belong to the first group, the image data and nearby-vehicle information which were transferred from the second vehicle.

The method may further comprises that the information on the line of vehicles is updated based on the transferred nearby-vehicle information, and the transferred image data is associated with the updated information on the line of vehicles.

The method may further comprises that the information on the line of vehicles is updated based on the nearby-vehicle information which was transferred by the vehicle which belongs to both of the first and second groups, and the transferred image data is associated with the updated information on the line of vehicles.

The method may further comprise presenting the display data on a display device in the vehicle.

The image data may one taken by an on-vehicle camera of a vehicle which is immediately ahead of or behind a vehicle in which the display data is presented.

The display data may comprise the aforementioned image data.

The display data may be one in which plural image data are superimposed according to the information on a line of vehicles, one in which plural image data are arranged according to the information on a line of vehicles, or one in which plural image data are displayed on an electronic map, according to the information on a line of vehicles.

A frequency of the transfer of the image data and nearby-vehicle information in the transfer done by the first vehicle may be lower than that of the transmission of the image data and nearby-vehicle information done by each of the remaining vehicles in the first group.

The number of images in the transfer done by the first vehicle may be smaller than that of the images in the transmission of the image data done by each of the remaining vehicles in the first group.

A frequency of the transfer of the image data and nearby-vehicle information to be transferred (hereinafter, in this embodiment, referred to as "first transfer frequency") may be lowered in the transfer of the image data and nearby-vehicle information which were sent from the all of the other vehicles which belong to the third group to the other vehicles which belong to the second group, a frequency of the transfer of the image data and nearby-vehicle information to be transferred (hereinafter, in this embodiment, referred to as "second transfer frequency") is lowered in the transfer of the image data and nearby-vehicle information which were originated from the all of the other vehicles which belong to the third group to the other vehicles which belong to the first group, and the first transfer frequency is lower than the second transfer frequency.

The number of images to be transferred (hereinafter, in this embodiment, referred to as "the first number of images") may be reduced in the transfer of the image data which was sent from the all of the other vehicles which belong to the third group to the other vehicles which belong to the second group, the number of images to be transferred (hereinafter, in this embodiment, referred to as "the second number of images") is reduced in the transfer of the image data which was originated from the all of the other vehicles which belong to the third group to the other vehicles which belong to the first group, and the first number of images is smaller than the second number of images.

The method may further comprises that the plurality of vehicles is defined as a first group, and one or more other groups are formed similarly, and, if a first vehicle which belongs to the first group belongs also to the one or more other groups, the first vehicle receives, from all of the other vehicles which belong to the one or more other groups, image data taken by the on-vehicle camera of each of the one or more other groups and nearby-vehicle information on a vehicle which is immediately ahead of this each of the one or more other groups, and then transfers, to other vehicles which belong to the first group, this received image data and nearby-vehicle information.

The method may further comprises: presenting the display data on a display device in the vehicle, and, in response to a selection by a user of a specific vehicle or image originated from the specific vehicle, controlling one or more vehicles which transfer image data originated from the specific vehicle so as to stop lowering the frequency of the transfer, or to restore the original frequency of the transfer, or to make the present frequency of the transfer closer to the original frequency of the transfer.

The display data comprising image data which is being continuously sent from the specific vehicle may be displayed in real-time on the display device The method may further comprises: presenting the display data on a display device in the vehicle, and, in response to a selection by a user of a specific vehicle or image originated from the specific vehicle, controlling one or more vehicles which transfer image data originated from the specific vehicle so as to stop reducing the number of images, or to restore the original number of images, or to make the present number of images closer to the original number of images.

The display data comprising image data which is being continuously sent from the specific vehicle may be displayed in real-time on the display device.

The method may further comprises: presenting the display data on a display device in the vehicle, and, in response to a selection by a user of a specific location or image data showing a specific location, controlling one or more vehicles which transfer image data originated from the specific vehicle so as to stop lowering the frequency of the transfer, or to restore the original frequency of the transfer, or to make the present frequency of the transfer closer to the original frequency of the transfer.

The display data comprising image data which is being continuously transferred from the one or more vehicles may be displayed in real-time on the display device.

The method may further comprises: presenting the display data on a display device in the vehicle, and, in response to a selection by a user of a specific location or image data showing a specific location, controlling one or more vehicles which transfer image data originated from the specific vehicle so as to stop reducing the number of images, or to restore the original number of images, or to make the present number of images closer to the original number of images.

The display data comprising image data which is being continuously transferred from the one or more vehicles may be displayed in real-time on the display device.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "a/one" should be understood as "at least one".

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

The invention claimed is:

1. A computer-implemented method for transferring image data taken by an on-vehicle camera, the method comprising:
receiving, by a receiver, the image data and nearby-vehicle information on a vehicle, the image data and the nearby-vehicle information being successively transferred from each of a plurality of vehicles capable of making a communication with each other, wherein the nearby-vehicle information comprises letters, numbers of combination thereof on a vehicle number plate and an Internet Protocol address associated with a vehicle;
generating, by a processor, information on a line of vehicles based on the nearby-vehicle information;
associating, by the processor, the image data with the information on the line of vehicles in response to generating the information on the line of vehicles, wherein the line of vehicles is composed of a plurality of groups, and each of the groups has at least one vehicle commonly belonging to two or more groups among the plurality of groups, and the at least one vehicle transfers the image data and the nearby-vehicle information to the two or more groups, wherein each vehicle within a group can only communicate with one or more other vehicles in another group in response to belonging to the another group, wherein vehicles which belong to each of the plurality of groups are dynamically changed;
combining vehicle information of a driver's vehicle with nearby-vehicle information of a nearby vehicle to generate a set of own vehicle information and nearby-vehicle information; and
transferring the set of own vehicle information and nearby-vehicle information to one or more other vehicles.

2. The method as recited in claim 1 further comprising:
successively transferring image data taken by an on-vehicle camera of a specified vehicle other than a driver's vehicle in response to a user selection of the specified vehicle.

3. The method as recited in claim 2, wherein display data comprising image data which is being successively sent from the specified vehicle other than the driver's vehicle is displayed in real-time on a display device of a vehicle.

4. The method as recited in claim 1 further comprising:
successively transferring image data taken by an on-vehicle camera of each of the plurality of vehicles which locates in a vicinity of a specified location or a specified subject in response to a user selection of the specified location or the specified subject.

5. The method as recited in claim 4, wherein display data comprising image data which is being successively sent from each of the plurality of vehicles is displayed in real time on a display device of a vehicle.

6. A computer program product for transferring image data taken by an on-vehicle camera, the computer program product comprising a computer readable storage medium having program code embodied therewith, the program code comprising the programming instructions for:
- receiving, by a receiver, the image data and nearby-vehicle information on a vehicle, the image data and the nearby-vehicle information being successively transferred from each of a plurality of vehicles capable of making a communication with each other, wherein the nearby-vehicle information comprises letters, numbers of combination thereof on a vehicle number plate and an Internet Protocol address associated with a vehicle;
- generating information on a line of vehicles based on the nearby-vehicle information;
- associating the image data with the information on the line of vehicles in response to generating the information on the line of vehicles, wherein the line of vehicles is composed of a plurality of groups, and each of the groups has at least one vehicle commonly belonging to two or more groups among the plurality of groups, and the at least one vehicle transfers the image data and the nearby-vehicle information to the two or more groups, wherein each vehicle within a group can only communicate with one or more other vehicles in another group in response to belonging to the another group, wherein vehicles which belong to each of the plurality of groups are dynamically changed;
- combining vehicle information of a driver's vehicle with nearby-vehicle information of a nearby vehicle to generate a set of own vehicle information and nearby-vehicle information; and
- transferring the set of own vehicle information and nearby-vehicle information to one or more other vehicles.

7. The computer program product as recited in claim 6, wherein the program code further comprises the programming instructions for:
- successively transferring image data taken by an on-vehicle camera of a specified vehicle other than a driver's vehicle in response to a user selection of the specified vehicle.

8. The computer program product as recited in claim 7, wherein display data comprising image data which is being successively sent from the specified vehicle other than the driver's vehicle is displayed in real-time on a display device of a vehicle.

9. The computer program product as recited in claim 6, wherein the program code further comprises the programming instructions for:
- successively transferring image data taken by an on-vehicle camera of each of the plurality of vehicles which locates in a vicinity of a specified location or a specified subject in response to a user selection of the specified location or the specified subject.

10. The computer program product as recited in claim 9, wherein display data comprising image data which is being successively sent from each of the plurality of vehicles is displayed in real time on a display device of a vehicle.

11. A system, comprising:
- a memory unit for storing a computer program for transferring image data taken by an on-vehicle camera; and
- a processor coupled to the memory unit, wherein the processor is configured to execute the program instructions of the computer program comprising:
  - receiving, by a receiver, the image data and nearby-vehicle information on a vehicle, the image data and the nearby-vehicle information being successively transferred from each of a plurality of vehicles capable of making a communication with each other, wherein the nearby-vehicle information comprises letters, numbers of combination thereof on a vehicle number plate and an Internet Protocol address associated with a vehicle;
  - generating information on a line of vehicles based on the nearby-vehicle information;
  - associating the image data with the information on the line of vehicles in response to generating the information on the line of vehicles, wherein the line of vehicles is composed of a plurality of groups, and each of the groups has at least one vehicle commonly belonging to two or more groups among the plurality of groups, and the at least one vehicle transfers the image data and the nearby-vehicle information to the two or more groups, wherein each vehicle within a group can only communicate with one or more other vehicles in another group in response to belonging to the another group, wherein vehicles which belong to each of the plurality of groups are dynamically changed;
  - combining vehicle information of a driver's vehicle with nearby-vehicle information of a nearby vehicle to generate a set of own vehicle information and nearby-vehicle information; and
  - transferring the set of own vehicle information and nearby-vehicle information to one or more other vehicles.

12. The system as recited in claim 11, wherein the program instructions of the computer program further comprise:
- successively transferring image data taken by an on-vehicle camera of a specified vehicle other than a driver's vehicle in response to a user selection of the specified vehicle.

13. The system as recited in claim 12, wherein display data comprising image data which is being successively sent from the specified vehicle other than the driver's vehicle is displayed in real-time on a display device of a vehicle.

14. The system as recited in claim 11, wherein the program instructions of the computer program further comprise:
- successively transferring image data taken by an on-vehicle camera of each of the plurality of vehicles which locates in a vicinity of a specified location or a specified subject in response to a user selection of the specified location or the specified subject.

* * * * *